(12) United States Patent
Sogo et al.

(10) Patent No.: US 11,193,794 B2
(45) Date of Patent: Dec. 7, 2021

(54) ROTATION ANGLE SENSOR, ANGLE SIGNAL CALCULATION METHOD AND NON-TRANSITORY COMPUTER READABLE MEDIUM

(71) Applicant: ASAHI KASEI MICRODEVICES CORPORATION, Tokyo (JP)

(72) Inventors: Kenta Sogo, Tokyo (JP); Takeo Yamamoto, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 20 days.

(21) Appl. No.: 16/904,964

(22) Filed: Jun. 18, 2020

(65) Prior Publication Data

US 2020/0400463 A1 Dec. 24, 2020

(30) Foreign Application Priority Data

Jun. 21, 2019 (JP) .............................. JP2019-115447
Jun. 16, 2020 (JP) .............................. JP2020-103836

(51) Int. Cl.
*G01D 5/14* (2006.01)
*G01D 5/16* (2006.01)

(52) U.S. Cl.
CPC ............... *G01D 5/145* (2013.01); *G01D 5/16* (2013.01)

(58) Field of Classification Search
CPC ........... G01D 5/12; G01D 5/14; G01D 5/142; G01D 5/145; G01D 5/16; G01R 33/06–098
See application file for complete search history.

(56) References Cited

U.S. PATENT DOCUMENTS

| 6,762,897 B1 | 7/2004 | Kobashima et al. |
| 2002/0021124 A1 | 2/2002 | Schott et al. |
| 2012/0001620 A1* | 1/2012 | Laville .................. G01D 5/145 |
| | | 324/207.2 |
| 2012/0161755 A1 | 6/2012 | Masson et al. |

(Continued)

FOREIGN PATENT DOCUMENTS

| JP | H03-170011 A | 7/1991 |
| JP | 2002-071381 A | 3/2002 |

(Continued)

*Primary Examiner* — Huy Q Phan
*Assistant Examiner* — David B Frederiksen
(74) *Attorney, Agent, or Firm* — Morgan, Lewis & Bockius LLP

(57) ABSTRACT

A rotation angle sensor includes first and second magnetic detection elements disposed at positions where a first disposition angle relative to a magnet center is greater than 0 degrees and less than 90 degrees and configured to acquire magnetic field in a first direction varying by a rotation of a magnet; third and fourth magnetic detection elements configured to acquire the magnetic field in a second direction; a calculation signal generator configured to output a first magnetic field calculation signal, based on outputs of the first and second magnetic detection elements, and configured to output a second magnetic field calculation signal, based on outputs of the third and fourth magnetic detection elements; and an angle signal generator configured to generate and output an angle signal indicative of a rotation angle of the magnet, based on the first and second magnetic field calculation signal.

20 Claims, 14 Drawing Sheets

(56) References Cited

U.S. PATENT DOCUMENTS

| | | | |
|---|---|---|---|
| 2014/0225596 A1* | 8/2014 | Nakamura | G01D 5/145 |
| | | | 324/207.2 |
| 2015/0226581 A1 | 8/2015 | Schott et al. | |
| 2015/0260546 A1* | 9/2015 | Hirota | G01D 5/14 |
| | | | 324/207.21 |
| 2015/0293184 A1 | 10/2015 | Kaufinann et al. | |
| 2018/0274896 A1* | 9/2018 | Anagawa | G01R 33/09 |
| 2018/0274898 A1* | 9/2018 | Uchida | G01D 5/145 |
| 2019/0242724 A1 | 8/2019 | Schott et al. | |

FOREIGN PATENT DOCUMENTS

| | | |
|---|---|---|
| JP | 2011-503630 A | 1/2011 |
| JP | 2012-251809 A | 12/2012 |
| JP | 2015-526730 A | 9/2015 |
| JP | 2017-003312 A | 1/2017 |
| WO | 99/013296 A1 | 3/1999 |
| WO | 2018/092416 A1 | 5/2018 |

\* cited by examiner

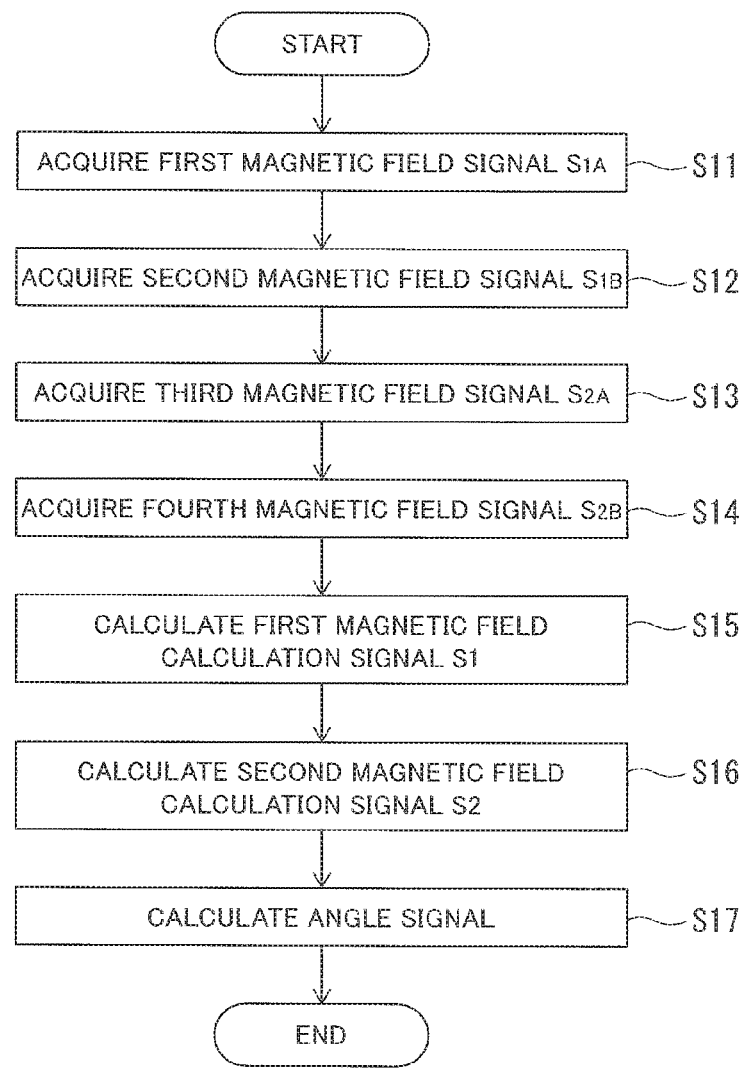

ROTATION ANGLE SENSOR, ANGLE SIGNAL CALCULATION METHOD AND NON-TRANSITORY COMPUTER READABLE MEDIUM

TECHNICAL FIELD

The present disclosure relates to a rotation angle sensor, an angle signal calculation method and a non-transitory computer readable medium.

BACKGROUND ART

Conventionally, there is known a rotation angle sensor which detects a magnetic field near a magnet, which varies by the rotation of the magnet, and detects a rotation angle θ of the magnet, based on the detected magnetic field. A rotary body, such as a motor, is connected to the magnet. Thus, the rotation angle sensor can detect the rotation of the motor by detecting the rotation of the magnet.

As regards a rotation angle sensor, a study has been made to improve the precision of detection of the rotation angle of a magnet, by examining an arrangement and shapes of the magnet and magnetic detection elements disposed around the magnet (e.g. International Publication WO 99/013296).

SUMMARY OF INVENTION

When a rotation angle sensor is used as a magnetic encoder, an error occurs in an angle signal which is output from the rotation angle sensor, due to disturbance magnetic flux such as leakage magnetic flux from a motor, or geomagnetic, and it is difficult to exactly detect the rotation of the motor.

Thus, the object of the present disclosure is to provide a rotation angle sensor, an angle signal calculation method and a non-transitory computer readable medium, which makes it possible to detect the rotation angle of a magnet with high precision, even in a case of use in an environment in which disturbance magnetic flux occurs.

In order to solve the above problem, a rotation angle sensor according to one embodiment of the present disclosure includes: a magnet disposed to be rotatable around a rotational axis and polarized into at least two poles in a direction perpendicular to the rotational axis; a first magnetic detection element and a second magnetic detection element configured to detect a magnetic field in a first direction varying by a rotation of the magnet; a third magnetic detection element and a fourth magnetic detection element configured to detect the magnetic field in a second direction, the second direction being different from the first direction; a calculation signal generator configured to output a first magnetic field calculation signal, based on an output of the first magnetic detection element and an output of the second magnetic detection element, and configured to output a second magnetic field calculation signal, based on an output of the third magnetic detection element and an output of the fourth magnetic detection element, the second magnetic field calculation signal being different in phase from the first magnetic field calculation signal; and an angle signal generator configured to generate and output an angle signal indicative of a rotation angle of the magnet, based on the first magnetic field calculation signal and the second magnetic field calculation signal, wherein the first magnetic detection element and the second magnetic detection element are disposed at positions where a first disposition angle is greater than 0 degrees and less than 90 degrees, the first disposition angle is an angle formed by a line segment connecting the first magnetic detection element and the magnet and a line segment connecting the second magnetic detection element and the magnet, the first disposition angle is, in plan view, a smaller angle of angles formed by a line segment connecting the first magnetic detection element and the rotational axis and a line segment connecting the second magnetic detection element and the rotational axis, or is, in cross-sectional view, a smaller angle of angles formed by a line segment connecting the first magnetic detection element and a center of the magnet, and a line segment connecting the second magnetic detection element and the center, and the first magnetic detection element is disposed at a position different from a position of the third magnetic detection element.

In order to solve the above problem, an angle signal calculation method according to one embodiment of the present disclosure includes: acquiring a magnetic field in a first direction varying by a rotation of a magnet disposed to be rotatable around a rotational axis and polarized into at least two poles in a direction perpendicular to the rotational axis, as an output of a first magnetic detection element; acquiring a magnetic field in the first direction as an output of a second magnetic detection element disposed at a position different from a position of the first magnetic detection element and at a position where a first disposition angle, relative to the first magnetic detection element, is greater than 0 degrees and less than 90 degrees, the first disposition angle being, in plan view, a smaller angle of angles formed by a line segment connecting the first magnetic detection element and the rotational axis and a line segment connecting the second magnetic detection element and the rotational axis, or being, in cross-sectional view, a smaller angle of angles formed by a line segment connecting the first magnetic detection element and a center of the magnet and a line segment connecting the second magnetic detection element and the center; acquiring the magnetic field in a second direction different from the first direction as an output of a third magnetic detection element and an output of a fourth magnetic detection element, the third magnetic detection element and the fourth magnetic detection element being disposed at positions different from the position of the first magnetic detection element; outputting a first magnetic field calculation signal, based on the output of the first magnetic detection element and the output of the second magnetic detection element; outputting a second magnetic field calculation signal different in phase from the first magnetic field calculation signal, based on the output of the third magnetic detection element and the output of the fourth magnetic detection element; and outputting an angle signal indicative of a rotation angle of the magnet, based on the first magnetic field calculation signal and the second magnetic field calculation signal.

In order to solve the above problem, a non-transitory computer readable medium according to one embodiment of the present disclosure has stored thereon a program causing a computer to execute: acquiring a magnetic field in a first direction varying by a rotation of a magnet disposed to be rotatable around a rotational axis and polarized into at least two poles in a direction perpendicular to the rotational axis, as an output of a first magnetic detection element; acquiring the magnetic field in the first direction as an output of a second magnetic detection element disposed at a position different from a position of the first magnetic detection element and at a position where a first disposition angle, relative to the first magnetic detection element, is greater than 0 degrees and less than 90 degrees, the first disposition angle being, in plan view, a smaller angle of angles formed by a line segment connecting the first magnetic detection element and the rotational axis and a line segment connecting the second magnetic detection element and the rotational axis, or being, in cross-sectional view, a smaller angle of angles formed by a line segment connecting the first magnetic detection element and a center of the magnet and a line segment connecting the second magnetic detection element and the center; acquiring a magnetic field in a second direction different from the first direction as an output of a third magnetic detection element and an output of a fourth magnetic detection element, the third magnetic detection element and the fourth magnetic detection element being disposed at positions different from the position of the first magnetic detection element; outputting a first magnetic field calculation signal, based on the output of the first magnetic detection element and the output of the second magnetic detection element; outputting a second magnetic field calculation signal different in phase from the first magnetic field calculation signal, based on the output of the third magnetic detection element and the output of the fourth magnetic detection element; and outputting an angle signal indicative of a rotation angle of the magnet, based on the first magnetic field calculation signal and the second magnetic field calculation signal.

Advantageous Effects of Invention

According to the present disclosure, there can be provided a rotation angle sensor, an angle signal calculation method and a non-transitory computer readable medium, which make it possible to detect the rotation angle of a magnet with high precision, even in a case of use in an environment in which disturbance magnetic flux occurs.

BRIEF DESCRIPTION OF DRAWINGS

FIG. 7 is a flowchart for describing an angle signal calculation method which is executed by the rotation angle sensor according to the first embodiment;

DESCRIPTION OF EMBODIMENTS

Embodiments of the present disclosure will now be described with reference to the drawings. However, the embodiments to be described below are merely exemplary ones, and there is no intention to exclude applications of various modifications and technologies which are not explicitly described below. The present disclosure can be implemented by variously modifying the disclosure (e.g. by combining embodiments) without departing from the spirit of the disclosure. In addition, in the descriptions of the drawings, identical or similar parts are denoted by identical or similar reference signs.

1. First Embodiment

Figure 1:
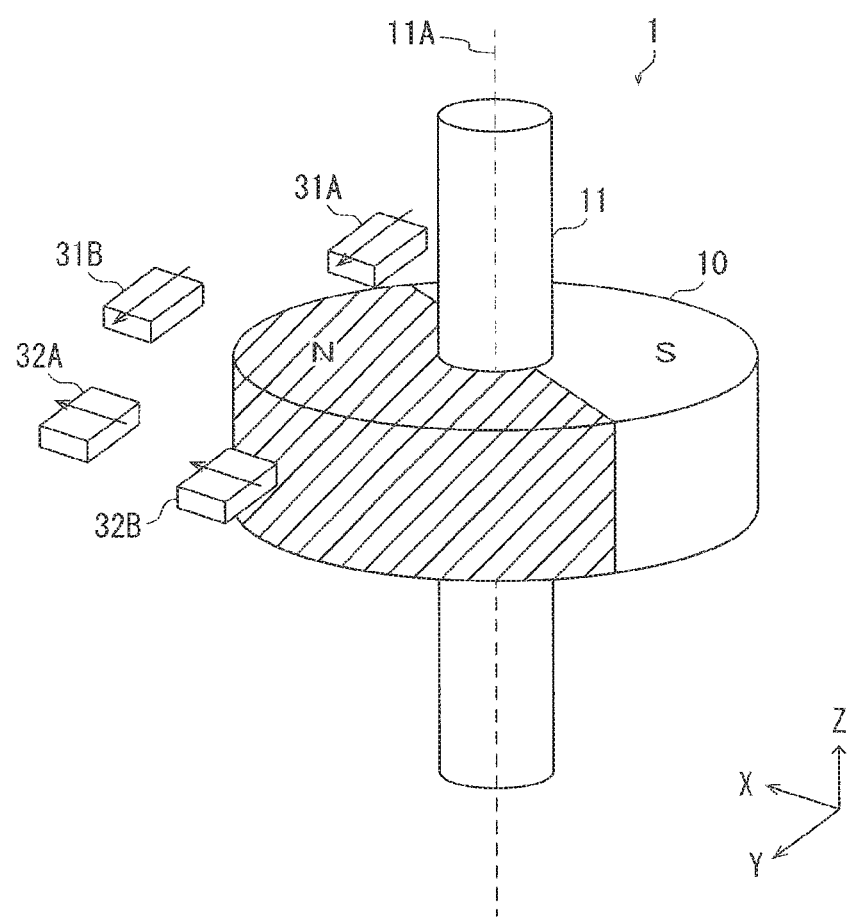
FIG. 1 is a schematic view illustrating a configuration example of a rotation angle sensor according to a first embodiment.

Referring to FIG. 1 to FIG. 7, a rotation angle sensor 1 according to a first embodiment will be described in detail. FIG. 1 illustrates a configuration example of the rotation angle sensor 1.

(1-1) Configuration of Rotation Angle Sensor

The rotation angle sensor 1 detects, in a non-contact manner, a rotation angle of a magnet 10 which rotates. The rotation angle sensor 1 includes the magnet 10 and a rotation angle detector 20.

In the present embodiment, it is assumed that a rotational plane of the magnet 10 is an X-Y plane, and a direction parallel to a rotational axis 11A of the magnet 10 is a Z-axis direction. The rotation angle sensor 1 detects and outputs a rotation angle θ of the magnet 10 which rotates in the X-Y plane. In addition, in the present embodiment, it is assumed that a case of viewing the rotation angle sensor 1 in a direction parallel to the Z axis is "plan view".

The magnet 10 rotates, for example, in accordance with the rotation of a motor or the like (hereinafter, also referred to as "rotary body") of an external device.

The rotation angle detector 20 detects, as a magnetic field signal, a magnetic field Br near the magnet 10, which varies by the rotation of the magnet 10, and generates and outputs, based on the magnetic field signal, an angle signal Sθ which corresponds to the rotation angle of the magnet 10. The rotation angle detector 20 outputs the angle signal Sθ to a controller or the like of the above-described rotary body, via a terminal included in the rotation angle sensor 1.

Thereby, the external device can control the operation of the rotary body, based on the angle signal Sθ acquired from the rotation angle sensor 1.

Hereinafter, the respective parts of the rotation angle sensor 1 will be described in detail.

<Magnet>

Figure 2:
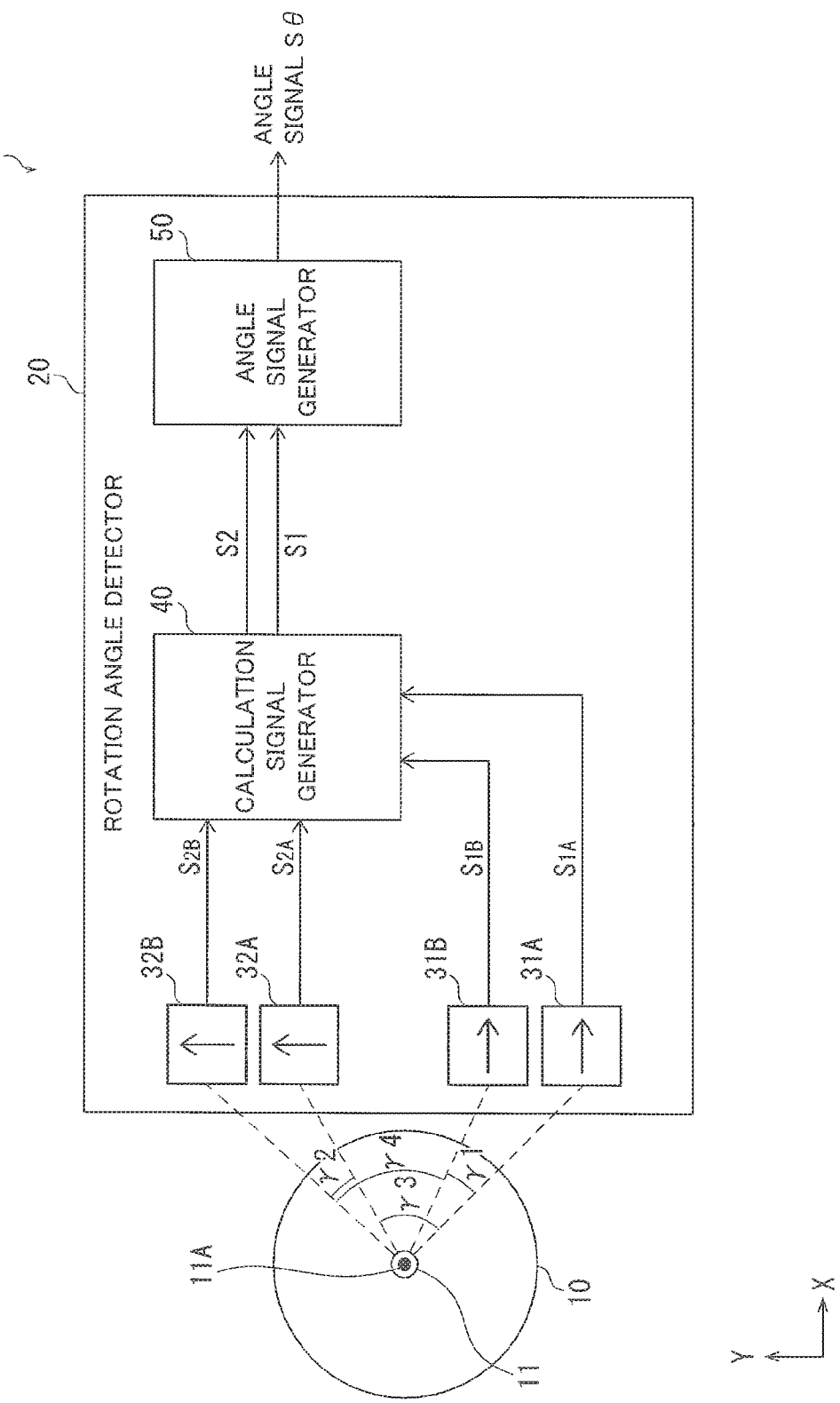
FIG. 2 is a block diagram illustrating an example of a configuration of a magnet and a rotation angle detector in the rotation angle sensor according to the first embodiment.

FIG. 2 is a block diagram illustrating an example of a configuration of the rotation angle sensor 1 including the magnet 10 and the rotation angle detector 20.

As illustrated in FIG. 1, the magnet 10 is fixed to the rotational shaft 11 extending along the rotational axis 11A, and is disposed to be rotatable around the rotational axis 11A. The magnet 10 has a substantially circular shape in plan view, and is polarized into at least two poles in a direction perpendicular to the rotational axis 11A. The magnet 10 of the present embodiment is a bipolar magnet which is divided into two semicircular regions, with one of the regions being an S pole, and the other region being an N pole.

The rotational shaft 11 is extending in the Z-axis direction. One end of the rotational shaft 11 is connected to the center of the magnet 10, and the other end of the rotational shaft 11 is connected to the rotary body of the external device. Thereby, the magnet 10 rotates in the X-Y plane in accordance with the rotation of the rotary body of the external device. The magnet 10 rotates in the X-Y plane, and thereby the positions of the S pole and the N pole change, thus varying a magnetic field occurring around the magnet 10.

The magnet 10 rotates in a plane substantially parallel to the X-Y plane, and thereby the rotation angle detector 20 detects a cyclical magnetic field signal corresponding to the rotation of the magnet 10. The magnetic field signal is expressed by (Math. 1) equation. Here, B is indicative of an absolute value of the magnetic field detected in the rotation angle detector 20. In the present embodiment, it is assumed that B is substantially constant, and is treated as a constant (B=1). In addition, θ is indicative of the rotation angle of the magnet 10, relative to a predetermined direction or a reference direction.

$$Br(\theta)=B\cdot\cos\theta \quad \text{(Math. 1)}$$

<Rotation Angle Detector>

The rotation angle detector 20 detects a magnetic field in a first direction and a magnetic field in a second direction which varies by the rotation of the magnet 10. Based on the magnetic field in the first direction and the magnetic field in the second direction, the rotation angle detector 20 generates and outputs the angle signal Sθ indicative of the rotation angle θ of the magnet 10 at a detection timing.

In the present embodiment, it suffices if the "first direction" and the "second direction" are different from each other.

In this embodiment, a case is described in which the "first direction" is a direction perpendicular to the rotational axis 11A, and the "second direction" is a direction perpendicular to the first direction and perpendicular to the rotational axis 11A. Specifically, a case is described in which the "first direction" is the X-axis direction, and the "second direction" is a direction rotated by 5 degrees from the X axis in the X-Y plane. Note that, in the present embodiment, a case is described in which 5 is 90 degrees, and the "second direction" is a Y-axis direction.

The rotation angle detector 20 includes magnetic detection elements 31A, 31B, 32A and 32B, a calculation signal generator 40, and an angle signal generator 50.

Hereinafter, the respective parts of the rotation angle detector 20 will be described. In the description below, it is assumed that a uniform disturbance magnetic field Be occurs at arrangement positions of the magnetic detection elements 31A, 31B, 32A and 32B.

(Magnetic Detection Elements)

As illustrated in FIG. 1, the magnetic detection elements 31A, 31B, 32A and 32B (examples of a first magnetic detection element, a second magnetic detection element, a third magnetic detection element and a fourth magnetic detection element) are disposed on a lateral side of the magnet 10.

The magnetic detection elements 31A and 31B are elements which detect a magnetic field in the first direction. As illustrated in FIG. 2, the magnetic detection element 31A outputs a first magnetic field signal $S_{1A}$ corresponding to a magnetic field $B_{1A}$ in the first direction, which is input to the magnetic detection element 31A at a detection timing. The magnetic detection element 31B outputs a second magnetic field signal $S_{1B}$ corresponding to a magnetic field $B_{1B}$ in the first direction, which is input to the magnetic detection element 31B at a detection timing.

The magnetic detection elements 32A and 32B are elements which detect a magnetic field in the second direction. As illustrated in FIG. 2, the magnetic detection element 32A outputs a third magnetic field signal $S_{2A}$ corresponding to the magnetic field $B_{2A}$ in the second direction, which is input to the magnetic detection element 32A at a detection timing. The magnetic detection element 32B outputs a fourth magnetic field signal $S_{2B}$ corresponding to the magnetic field $B_{2B}$ in the second direction, which is input to the magnetic detection element 32B at a detection timing.

The first magnetic field signal $S_{1A}$, second magnetic field signal $S_{1B}$, third magnetic field signal $S_{2A}$ and fourth magnetic field signal $S_{2B}$ are, for example, signals indicative of voltage. Analog voltage signals detected by the magnetic detection elements 31A, 31B, 32A and 32B are amplified in signal level and converted to digital signals in an amplifier (not illustrated) and an AD converter (not illustrated), and are output as the first magnetic field signal $S_{1A}$, second magnetic field signal $S_{1B}$, third magnetic field signal $S_{2A}$ and fourth magnetic field signal $S_{2B}$.

When the disturbance magnetic field Be occurs at arrangement positions of the magnetic detection elements 31A, 31B, 32A and 32B, the magnetic detection elements 31A and 31B output the first magnetic field signal $S_{1A}$ and second magnetic field signal $S_{1B}$, respectively, which correspond to a composite magnetic field in the first direction between the magnetic field Br and the disturbance magnetic field Be. Similarly, the magnetic detection elements 32A and 32B output the third magnetic field signal $S_{2A}$ and fourth magnetic field signal $S_{2B}$, respectively, which correspond to the composite magnetic field in the second direction.

The magnetic detection elements 31A and 31B may detect the magnetic field in the first direction, with an identical direction of the first direction being set as forward directions for the magnetic detection elements 31A and 31B, or may detect the magnetic field in the first direction, with opposite directions of the first direction being set as forward directions for the magnetic detection elements 31A and 31B. In other words, the magnetic detection elements 31A and 31B may have magnetosensitive axes which are directed in an identical direction, or may have magnetosensitive axes which are directed in opposite directions (the angle formed between the magnetosensitive axes is 180 degrees).

In addition, the magnetic detection elements 32A and 32B may detect the magnetic field in the second direction, with an identical direction of the second direction being set as forward directions for the magnetic detection elements 32A and 32B, or may detect the magnetic field in the second direction, with opposite directions of the second direction being set as forward directions for the magnetic detection elements 32A and 32B. In other words, the magnetic detection elements 32A and 32B may have magnetosensitive axes which are directed in an identical direction, or may have magnetosensitive axes which are directed in opposite directions (the angle formed between the magnetosensitive axes is 180 degrees).

Each of the magnetic detection elements 31A, 31B, 32A and 32B is a magnetoelectric conversion element, such as a Hall element, a magnetoresistive element (MR), a giant magnetoresistive element (GMR), a tunneling effect magnetoresistive element (TMR), a magneto-impedance element (MI element), and/or an inductance sensor. In addition, each of the magnetic detection elements 31A, 31B, 32A and 32B may be composed of a single magnetoelectric conversion element or may be composed of a plurality of magnetoelectric conversion elements. An example of the magnetic detection element composed of a plurality of magnetoelectric conversion elements is a circuit composed of magnetoelectric conversion elements (e.g. a bridge circuit such as a half-bridge circuit or a full-bridge circuit). Besides, the magnetic detection element composed of a plurality of magnetoelectric conversion elements may be configured to include a plurality of magnetoelectric conversion elements which output mixed signals including magnetic field magnetic fields in a plurality of directions, and a calculation circuit for extracting a magnetic field (e.g. the magnetic field in a first direction or the second direction) in a predetermined direction from the mixed signals. In this case, each magnetoelectric conversion element may be disposed adjacent to a magnetic convergence plate, and may detect the magnetic field in the first direction or the magnetic field in the second direction, by detecting a magnetic field whose direction is changed by the magnetic convergence plate.

(Calculation Signal Generator)

The calculation signal generator 40 performs calculations for outputting a first magnetic field calculation signal S1 and a second magnetic field calculation signal S2, based on the outputs of the magnetic detection elements 31A, 31B, 32A and 32B. The calculation signal generator 40 performs calculations in accordance with the directions of the magnetosensitive axes of the magnetic detection elements 31A and 31B, and outputs the first magnetic field calculation signal S1. Further, the calculation signal generator 40 performs calculations in accordance with the directions of the magnetosensitive axes of the magnetic detection elements 32A and 32B, and outputs the second magnetic field calculation signal S2.

For example, when the magnetosensitive axis of the magnetic detection element 31A and the magnetosensitive axis of the magnetic detection element 31B are in the identical direction, the calculation signal generator 40 calculates a difference between the first magnetic field signal $S_{1A}$, which is the output of the magnetic detection element 31A, and the second magnetic field signal $S_{1B}$, which is the output of the magnetic detection element 31B. In addition, when the magnetosensitive axis of the magnetic detection element 32A and the magnetosensitive axis of the magnetic detection element 32B are in the opposite directions, the calculation signal generator 40 calculates a sum of the third magnetic field signal $S_{2A}$, which is the output of the magnetic detection element 32A, and the fourth magnetic field signal $S_{2B}$, which is the output of the magnetic detection element 32B.

By performing the above calculations, leakage magnetic flux from the rotary body, such as a motor, which occurs in the environment of disposition of these elements, or the disturbance magnetic field Be due to geomagnetic or the like, can be reduced.

Specifically, by performing the above calculations, the calculation signal generator 40 can perform such a calculation that the disturbance magnetic field Be1, which is included in the first magnetic field signal $S_{1A}$ that is the output of the magnetic detection element 31A, and the disturbance magnetic field Be1, which is included in the second magnetic field signal $S_{1B}$ that is the output of the magnetic detection element 31B, have opposite signs. Thereby, the calculation signal generator 40 can generate the first magnetic field calculation signal S1 from which the disturbance magnetic field Be1 is eliminated.

In addition, the calculation signal generator 40 performs such a calculation that the disturbance magnetic field Be2, which is included in the third magnetic field signal $S_{2A}$ that is the output of the magnetic detection element 32A, and the disturbance magnetic field Be2, which is included in the fourth magnetic field signal $S_{2B}$ that is the output of the magnetic detection element 32B, have opposite signs. Thereby, the calculation signal generator 40 can generate the second magnetic field calculation signal S2 from which the disturbance magnetic field Be2 is eliminated When the magnetic detection element 31A and magnetic detection element 31B detect the magnetic field in the first direction, with the identical direction of the first direction being set as the forward directions, the calculation signal generator 40 calculates a difference between the first magnetic field signal $S_{1A}$ and the second magnetic field signal $S_{1B}$. Thereby, as illustrated in (Math. 8) equation, the calculation signal generator 40 generates the first magnetic field calculation signal S1 in which the magnetic field Be1 in the first direction of the disturbance magnetic field included in the first magnetic field signal $S_{1A}$ and the second magnetic field signal $S_{1B}$ is reduced.

$$S1 = S_{1B} - S_{1A} \quad \text{(Math. 8)}$$
$$= [\cos\{\theta + 2(\gamma1 - \alpha)\} + Be1] - \{\cos(\theta - 2\alpha) + Be1\}$$
$$= \cos(\theta - 2\alpha + 2\cdot\gamma1) - \cos(\theta - 2\alpha)$$

Similarly, the calculation signal generator 40 calculates a difference between the third magnetic field signal $S_{2A}$ and the fourth magnetic field signal $S_{2B}$. Thereby, as illustrated in (Math. 9) equation, the calculation signal generator 40 generates the second magnetic field calculation signal S2 in which a magnetic field Be2 in the second direction of the disturbance magnetic field included in the third magnetic field signal $S_{2A}$ and the fourth magnetic field signal $S_{2B}$ is reduced, and which differs in phase from the first magnetic field calculation signal S1.

$$\begin{aligned} S2 &= S_{2B} - S_{2A} \\ &= [\cos\{\theta + \delta + 2(\gamma 2 - \beta)\} + Be2] - \{\cos(\theta + \delta - 2\beta) + Be2\} \\ &= \cos(\theta + \delta - 2\beta + 2\cdot\gamma 2) - \cos(\theta + \delta - 2\beta) \end{aligned} \quad \text{(Math. 9)}$$

On the other hand, when the magnetic detection element 31A and magnetic detection element 31B detect the magnetic field in the first direction, with different directions of the first direction being set as the forward directions, the calculation signal generator 40 calculates a sum between the first magnetic field signal $S_{1A}$ and the second magnetic field signal $S_{1B}$. Thereby, as illustrated in (Math. 10) equation, the calculation signal generator 40 generates the first magnetic field calculation signal S1 in which the disturbance magnetic field Be1 in the first direction included in the first magnetic field signal $S_{1A}$ and the second magnetic field signal $S_{1B}$ is reduced.

$$\begin{aligned} S1 &= S_{1A} + S_{1B} \\ &= \{\cos(\theta - 2\alpha) + Be1\} + [-\cos\{\theta + 2(\gamma 1 - \alpha)\} - Be1] \\ &= \cos(\theta - 2\alpha) - \cos(\theta - 2\alpha + 2\cdot\gamma 1) \end{aligned} \quad \text{(Math. 10)}$$

Similarly, the calculation signal generator 40 calculates a sum between the third magnetic field signal $S_{2A}$ and the fourth magnetic field signal $S_{2B}$. Thereby, as illustrated in (Math. 11) equation, the calculation signal generator 40 generates the second magnetic field calculation signal S2 in which the disturbance magnetic field Be2 in the second direction included in the third magnetic field signal $S_{2A}$ and the fourth magnetic field signal $S_{2B}$ is reduced, and which differs in phase from the first magnetic field calculation signal S1.

$$\begin{aligned} S2 &= S_{2A} + S_{2B} \\ &= \{\cos(\theta + \delta - 2\beta) + Be2\} + \\ &\quad [-\cos\{\theta + \delta + 2(\gamma 2 - \beta)\} - Be2] \\ &= \cos(\theta + \delta - 2\beta) - \cos(\theta + \delta - 2\beta + 2\cdot\gamma 2) \end{aligned} \quad \text{(Math. 11)}$$

As illustrated in (Math. 8) to (Math. 11) equations, the first magnetic field calculation signal S1 and second magnetic field calculation signal S2, which are calculated by the calculation signal generator 40, do not include the disturbance magnetic field. In addition, the phase of the second magnetic field calculation signal S2 differs from the phase of the first magnetic field calculation signal S1.

The calculation signal generator 40 outputs the first magnetic field calculation signal S1 and second magnetic field calculation signal S2 to the angle signal generator 50.

(Angle Signal Generator)

Based on the first magnetic field calculation signal S1 and second magnetic field calculation signal S2, the angle signal generator 50 generates an angle signal Sθ indicative of the rotation angle of the magnet 10, and outputs the angle signal Sθ to a controller of an external device (e.g. a motor) on the outside of the rotation angle sensor 1.

The angle signal generator 50 calculates the rotation angle θ of the magnet 10, based on a signal obtained by rotating the magnet 10 by one revolution, the arrangement positions of the respective elements (disposition angles α, β, γ1, γ2), and an angle δ formed by magnetosensitive axes, and generates an angle signal indicative of the rotation angle θ of the magnet 10.

(Arrangement of Magnetic Detection Elements)

Figure 3A:
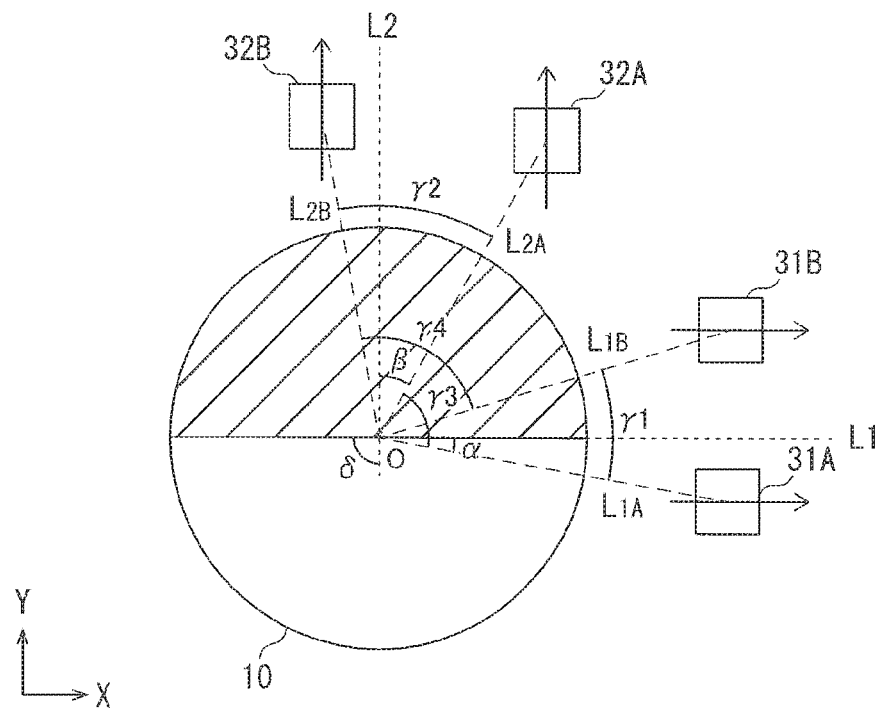
FIG. 3A is a plan view illustrating an arrangement relationship between magnetic detection elements and the magnet in the rotation angle sensor according to the first embodiment.

An example of the arrangement of the magnetic detection elements 31A, 31B, 32A and 32B according to the present embodiment will be described. FIG. 3A illustrates an arrangement relationship between the magnetic detection elements 31A and 31B which detect the magnetic field in the first direction that the magnet 10 generates, the magnetic detection elements 32A and 32B which detect the magnetic field Br in the second direction, and the magnet 10.

In FIG. 3A, arrows overlapping the magnetic detection elements 31A, 31B, 32A and 32B indicate the directions of magnetosensitive axes of the respective elements. Each of the magnetic detection elements 31A, 31B, 32A and 32B outputs a positive signal when the direction of a detected magnetic field is the same direction as the magnetosensitive axis, and outputs a negative signal when the direction of the detected magnetic field is opposite to the direction of the magnetosensitive axis.

In addition, FIG. 3A illustrates an example of the positional relationship between the magnet 10 and the magnetic detection elements 31A, 31B, 32A and 32B, and the positions of the S pole and N pole of the magnet 10 are not limited to the positions illustrated.

As illustrated in FIG. 3A, the magnetic detection element 31A and the magnetic detection element 31B are arranged in a manner to have a disposition angle γ1 (an example of a first disposition angle). The magnetic detection element 32A and the magnetic detection element 32B are arranged in a manner to have a disposition angle γ2 (an example of a second disposition angle).

Here, the disposition angle γ1 is, in plan view, a smaller angle of the angles formed by a line segment $L_{1A}$ which connects the magnetic detection element 31A and the rotational axis 11A (a rotational center O of the magnet 10), and a line segment $L_{1B}$ which connects the magnetic detection element 31B and the rotational axis 11A.

In addition, the disposition angle γ2 is, in plan view, a smaller angle of the angles formed by a line segment $L_{2A}$ which connects the magnetic detection element 32A and the rotational axis 11A (the rotational center O of the magnet 10), and a line segment $L_{2B}$ which connects the magnetic detection element 32B and the rotational axis 11A.

As illustrated in FIG. 3A, the magnetic detection element 31A and the magnetic detection element 32A are arranged in a manner to have a disposition angle γ3 (an example of a third disposition angle). The magnetic detection element 31B and the magnetic detection element 32B are arranged in a manner to have a disposition angle γ4 (an example of a fourth disposition angle).

Here, the disposition angle γ3 is, in plan view, a smaller angle of the angles formed by the line segment $L_{1A}$ and the line segment $L_{2A}$.

In addition, the disposition angle γ4 is, in plan view, a smaller angle of the angles formed by the line segment $L_{1B}$ and the line segment $L_{2B}$.

Figure 3B:
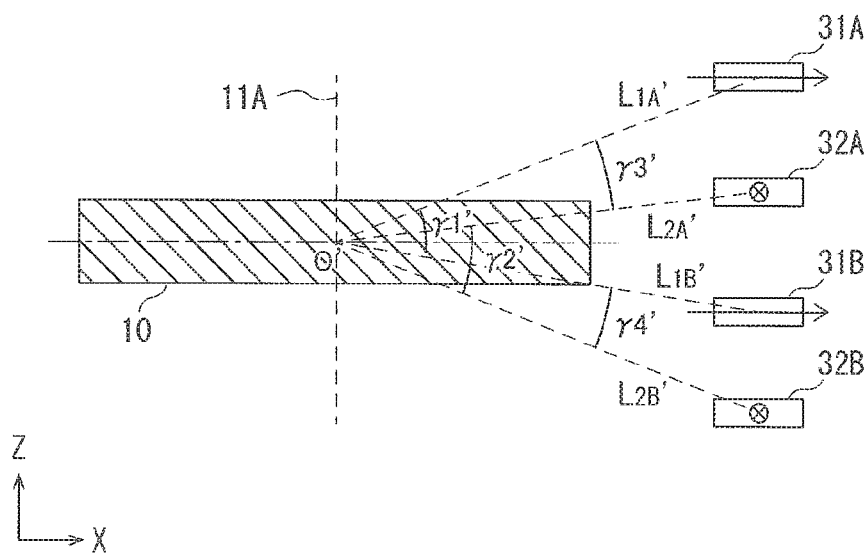
FIG. 3B is a cross-sectional view illustrating an arrangement relationship between the magnetic detection elements and the magnet in the rotation angle sensor according to the first embodiment.

In addition, as illustrated in FIG. 3B, when the magnetic detection elements 31A and 31B may be disposed at different positions in a rotational axis 11A direction. In that case, a smaller angle of the angles formed by a line segment $L_{1A}'$ which connects the magnetic detection element 31A and a center O' of the magnet 10 (a center in the thickness direction of the magnet 10 on the rotational axis 11A), and a line segment $L_{1B}'$ which connects the magnetic detection element 31B and the center O' of the magnet 10, in cross-sectional view through the rotational axis 11A and the magnetic detection element 31A or 31B, may be set as a disposition angle γ1' which is another example of the first disposition angle. When the magnetic detection elements 32A and 32B are disposed at different positions in the thickness direction of the magnet 10, a smaller angle of the angles formed by a line segment $L_{2A}'$ which connects the magnetic detection element 32A and the center O' of the magnet 10, and a line segment $L_{2B}'$ which connects the magnetic detection element 32B and the center O' of the magnet 10, in cross-sectional view through the rotational axis 11A and the magnetic detection element 32A or 32B, may be set as a disposition angle γ2' which is another example of the second disposition angle.

As illustrated in FIG. 3B, the magnetic detection element 31A and the magnetic detection element 32A are arranged in a manner to have a disposition angle γ3' which is another example of the third disposition angle. The magnetic detection element 31B and the magnetic detection element 32B are arranged in a manner to have a disposition angle γ4' which is another example of the fourth disposition angle.

Here, the disposition angle γ3' is, in cross-sectional view, a smaller angle of the angles formed by the line segment $L_{1A}'$ and the line segment $L_{2A}'$.

In addition, the disposition angle γ4' is, in cross-sectional view, a smaller angle of the angles formed by the line segment $L_{1B}'$ and the line segment $L_{2B}'$.

The disposition angles γ1' to γ4' can be substituted for disposition angles γ1 to γ4 which will be described below.

Note that when angles can be defined in each of plan view and cross-sectional view with respect to the first disposition angle and second disposition angle, it suffices if either of the angles is greater than 0 degrees and less than 90 degrees. For example, when γ1 is 15 degrees and y1' is 0 degrees, y1 can be set as the first disposition angle.

FIG. 3A illustrates an example in which the magnetic detection element 31A is disposed at a position of −α degrees with respect to a straight line L1 which passes through the rotational center O of the magnet 10 and is parallel to the magnetosensitive axes of the magnetic detection elements 31A and 31B. FIG. 3A illustrates an example in which the magnetic detection element 32A is disposed at a position of −β degrees with respect to a straight line L2 which passes through the rotational center O of the magnet 10 and is parallel to the magnetosensitive axes of the magnetic detection elements 32A and 32B.

A description will be given of outputs of the magnetic detection elements 31A, 31B, 32A and 32B arranged as illustrated in FIG. 3A. Here, it is assumed that a uniform disturbance magnetic field Be occurs at the arrangement position of each element.

At the arrangement position of the magnetic detection element 31A illustrated in FIG. 3A, a cyclic magnetic field occurs in accordance with the rotation angle θ of the magnet 10. Here, for the purpose of simplicity, a magnetic field in a direction parallel to a line segment connecting the rotational center of the magnet 10 and the magnetic detection element 31A is set as Br, which is given by (Math. 2) equation. In this case, if a magnetic field in a direction perpendicular to a line segment connecting the rotational center of the magnet 10 and the magnetic detection element 31A is set as Bt, a magnetic field, which is expressed by (Math. 3) equation, occurs. Note that a description is given on the assumption that an absolute value B of the magnetic field is "1".

$$Br=\cos(\theta-\alpha) \quad \text{(Math. 2)}$$

$$Bt=\sin(\theta-\alpha) \quad \text{(Math. 3)}$$

The magnetic detection element 31A detects the magnetic field in the first direction at the arrangement position of the magnetic detection element 31A. Accordingly, the magnetic detection element 31A outputs, as the first magnetic field signal $S_{1A}$ corresponding to the rotation angle θ of the magnet 10, a magnetic field signal obtained by synthesizing the magnetic field in the first direction included in the above-described Br and Bt. Further, when a disturbance magnetic field is applied to the magnetic detection element 31A, a signal corresponding to a disturbance magnetic field in the first direction is output. Thus, at this time, the magnetic detection element 31A outputs a magnetic field direction expressed by (Math. 4) equation. Here, Be1 is the disturbance magnetic field in the first direction (a first-directional component of the disturbance magnetic field Be).

$$S_{1A}=\cos(\theta-2\alpha)+Be1 \quad \text{(Math. 4)}$$

The magnetic detection element 31B is disposed at the disposition angle γ1, relative to the magnetic detection element 31A. Thus, if calculation is performed similarly as in the description of the above-described magnetic detection element 31A, the magnetic detection element 31B outputs a magnetic field expressed by (Math. 5) equation as the second magnetic field signal $S_{1B}$ corresponding to the rotation angle θ of the magnet 10.

$$S_{1B}=\cos\{\theta+2(\gamma 1-\alpha)\}+Be1 \quad \text{(Math. 5)}$$

Note that when the direction of the magnetosensitive axis of the magnetic detection element 31B is opposite to the direction of the magnetosensitive axis of the magnetic detection element 31A, the second magnetic field signal $S_{1B}$ outputs a magnetic field expressed by (Math. 5') equation.

$$S_{1B}=-\cos\{\theta+2(\gamma 1-\alpha)\}-Be1 \quad \text{(Math. 5')}$$

The magnetic detection element 32A detects the magnetic field in the second direction. The magnetic detection element 32A is disposed at the disposition angle γ3, relative to the magnetic detection element 31A. Thus, the magnetic detection element 32A outputs a magnetic field expressed by (Math. 6) equation as the third magnetic field signal $S_{2A}$ corresponding to the rotation angle θ of the magnet 10. Here, Be2 is a disturbance magnetic field in the second direction (a second-directional component of the disturbance magnetic field Be).

$$S_{2A}=\cos(\theta+\delta-2\beta)+Be2 \quad \text{(Math. 6)}$$

The magnetic detection element 32B is disposed at the disposition angle γ2, relative to the magnetic detection element 32A. Thus, the magnetic detection element 32B outputs a magnetic field expressed by (Math. 7) equation as the fourth magnetic field signal $S_{2B}$ corresponding to the rotation angle θ of the magnet 10.

$$S_{2B}=\cos\{\theta+\delta+2(\gamma 2-\beta)\}+Be2 \quad \text{(Math. 7)}$$

Note that when the direction of the magnetosensitive axis of the magnetic detection element 32B is opposite to the direction of the magnetosensitive axis of the magnetic detection element 32A, the second magnetic field signal $S_{1B}$ outputs a magnetic field expressed by (Math. 7') equation.

$$S_{2B}=-\cos\{\theta+\delta+2(\gamma2-\beta)\}-Be2 \quad \text{(Math. 7')}$$

In the rotation angle sensor 1, in order to generate the angle signal Sθ indicative of the rotation angle θ of the magnet 10, the magnetic detection elements 31A, 31B, 32A and 32B are arranged in a manner to meet the following arrangement conditions.

(a) First Arrangement Condition of Magnetic Detection Elements

It is preferable that the magnetic detection elements 31A, 31B, 32A and 32B are arranged such that the magnetic field generated by the magnet 10 are not canceled along with the disturbance magnetic field by the calculation in the calculation signal generator 40. For example, the magnetic detection elements 31A, 31B, 32A and 32B are arranged at positions where the disposition angles γ1 and γ2 are greater than 0 degrees and less than 180 degrees.

As described above, the calculation signal generator 40 performs calculations based on the output of the magnetic detection element 31A and the output of the magnetic detection element 31B. From (Math. 8), etc., it is understood that when the disposition angles γ1 and γ2 are 0 or 180 degrees, the magnetic field generated by the magnet 10 are also canceled by the calculation in the calculation signal generator 40.

Thus, the disposition angle γ1 of the magnetic detection elements 31A and 31B and the disposition angle γ2 of the magnetic detection elements 32A and 32B are adjusted to be greater than 0 degrees and less than 180 degrees.

Additionally, it is more preferable that the magnetic detection elements 31A, 31B, 32A and 32B are arranged at positions where at least one of the disposition angles γ1 and γ2 is greater than 0 degrees and not greater than 90 degrees.

As the disposition angles γ1 and γ2 become closer to 90 degrees, the angle signal Se that is output from the rotation angle sensor 1 becomes greater, and, in the case of 90 degrees, the angle signal Se becomes maximum, and this is preferable.

Additionally, as the disposition angle γ1 becomes smaller, the positions of the magnetic detection elements 31A and 31B become closer to each other, and the magnitudes of the disturbance magnetic field Be1 in the first direction, which the magnetic detection elements 31A and 31B detect, have closer values. Similarly, as the disposition angle γ2 becomes smaller, the magnitudes of the disturbance magnetic field Be2 in the second direction, which the magnetic detection elements 32A and 32B detect, have closer values. Thus, in the rotation angle sensor 1, since the influence of the disturbance magnetic field becomes smaller as the disposition angle γ1, γ2 becomes smaller, if at least one of the disposition angles γ1 and γ2 is greater than 0 degrees and less than 90 degrees, the detection precision of the rotation angle of the magnet 10 is improved, and this is preferable.

It is preferable that the disposition angles γ1 and γ2 are properly selected, based on the magnitude of the angle signal that is output from the rotation angle sensor 1, and the precision of the angle signal Sθ.

Additionally, in FIG. 2, the magnetic detection elements 31A and 31B, which detect the magnetic field in the first direction, and the magnetic detection elements 32A and 32B, which detect the magnetic field in the second direction, are arranged at different positions. There is a case in which the disturbance magnetic field Be1 in the first direction is not equal to the disturbance magnetic field Be2 in the second direction. Thus, by arranging the respective magnetic detection elements as described above, the effect of canceling the disturbance magnetic field in the respective direction can be improved and the precision of the angle signal Sθ can be improved, and this is preferable.

Figure 4:
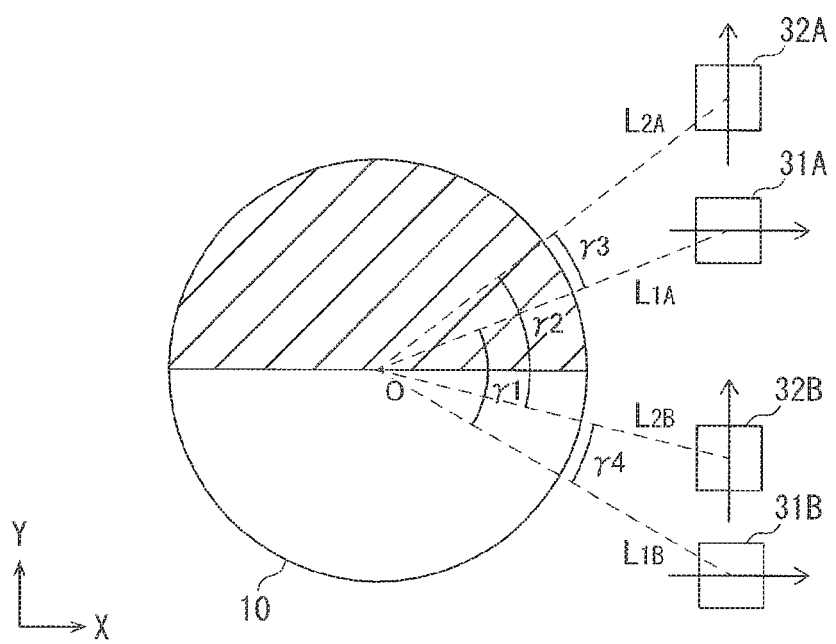
FIG. 4 is another example of the plan view illustrating the arrangement relationship between the magnetic detection elements and the magnet in the rotation angle sensor according to the first embodiment.

Additionally, the magnetic detection elements 31A and 31B and the magnetic detection elements 32A and 32B may be arranged as illustrated in FIG. 4. Specifically, the magnetic detection elements 31A, 31B, 32A and 32B may be arranged at different positions, and may be arranged such that at least one of the disposition angles γ1 and γ2 is greater than 0 degrees and less than 90 degrees (in FIG. 4, each of the disposition angles γ1 and γ2 is greater than 0 degrees and less than 90 degrees). Note that, in FIG. 4, although all of the magnetic detection elements 31A, 31B, 32A and 32B are arranged at different positions, only one of the magnetic detection elements 31A and 31B and only one of the magnetic detection elements 32A and 32B may be arranged at different positions.

Figure 5A:
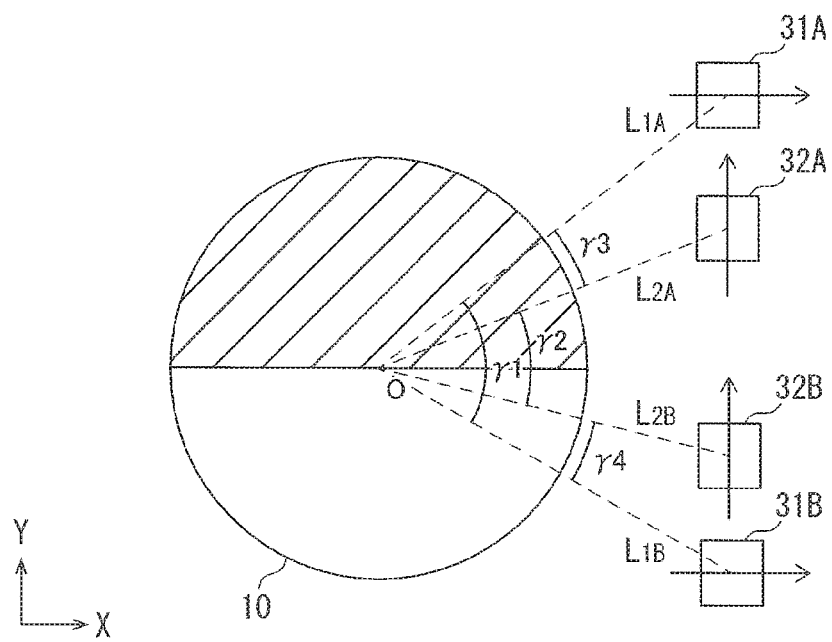
FIG. 5A and FIG. 5B are other examples of the plan view illustrating the arrangement relationship between the magnetic detection elements and the magnet in the rotation angle sensor according to the first embodiment.
Figure 5B:
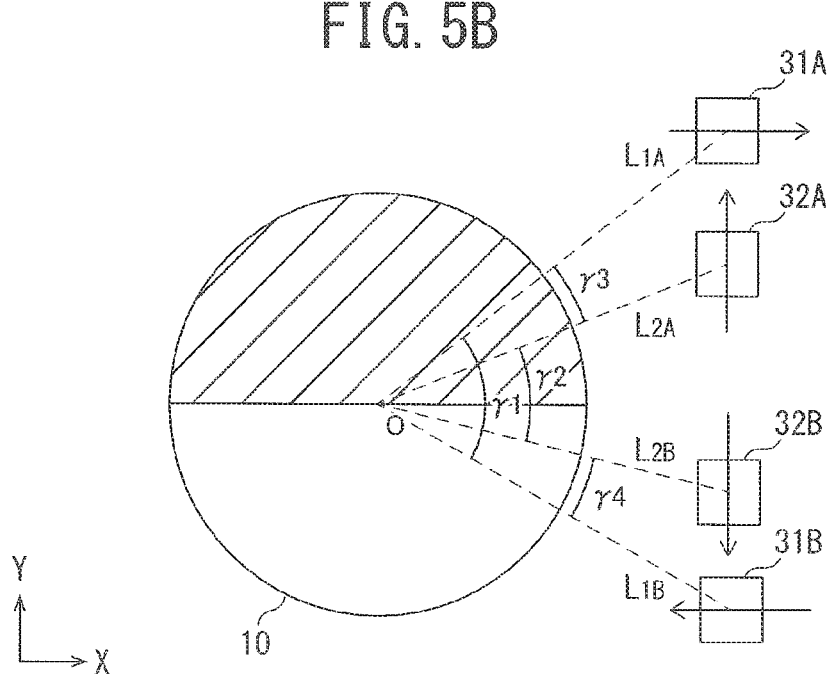

Additionally, as illustrated in FIG. 5A and FIG. 5B, the magnetic detection elements 31A, 31B, 32A and 32B may be arranged such that at least one of the disposition angles γ1 and γ2 is greater than 0 degrees and less than 90 degrees, and that the disposition angle γ2 is less than the disposition angle γ1. FIG. 5B differs from FIG. 5A in that the magnetic field detection direction of the magnetic detection element 31B in FIG. 5B differs by 180 degrees from the magnetic detection element 31B in FIG. 5A. In other words, it can be said that the magnetic detection elements 31A, 31B, 32A and 32B are arranged such that the distance between the magnetic detection elements 32A and 32B is less than the distance between the magnetic detection elements 31A and 31B. Since the magnetic detection elements 31A, 31B, 32A and 32B are arranged in this manner, when the disturbance magnetic field Be2 in the second direction is greater than the disturbance magnetic field Be1 in the first direction, the effect of cancellation of disturbance magnetic field Be2 can be enhanced. Moreover, a signal, which can be detected from the magnetic field in the first direction that is generated by the magnet 10, can be increased.

Figure 6A:
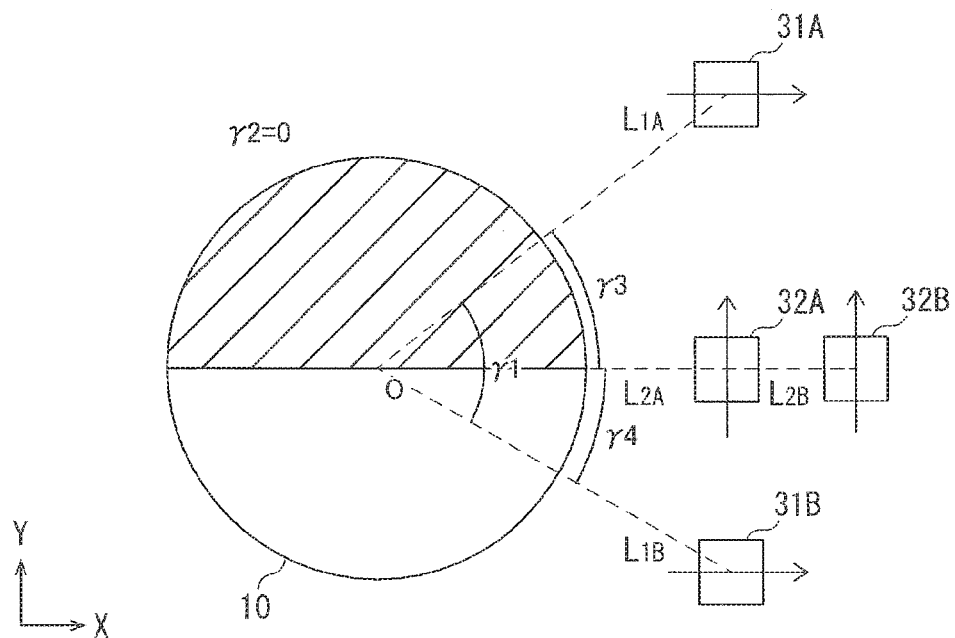
FIG. 6A and FIG. 6B are other examples of the plan view illustrating the arrangement relationship between the magnetic detection elements and the magnet in the rotation angle sensor according to the first embodiment.
Figure 6B:
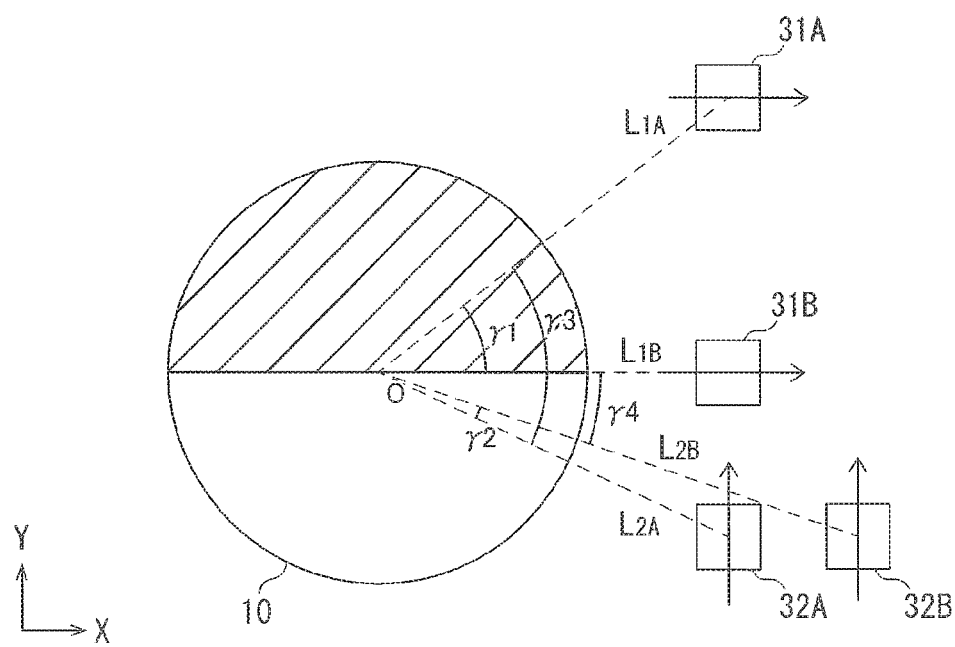

Additionally, the magnetic detection elements 31A, 31B, 32A and 32B may be arranged such that at least one of the disposition angles γ1 and γ2 is greater than 0 degrees and less than 90 degrees, and that either the magnetic detection elements 31A and 31B or the magnetic detection elements 32A and 32B are disposed in a direction perpendicular to the magnetic detection direction of the magnetic detection elements. Specifically, as illustrated in FIG. 6A, the magnetic detection elements 31A and 31B may be arranged along the second direction, and, as illustrated in FIG. 6B, the magnetic detection elements 32A and 32B may be arranged along the first direction. By arranging the magnetic detection elements as illustrated in FIG. 6A and FIG. 6B, the effect of canceling the disturbance magnetic field Be1 and the disturbance magnetic field Be2 in the respective direction can be enhanced.

(b) Second Arrangement Condition of Magnetic Detection Elements

In the rotation angle sensor 1, in order to generate the angle signal Sθ indicative of the rotation angle θ of the magnet 10, it is necessary to detect a phase difference between the first magnetic field calculation signal S1 and the second magnetic field calculation signal S2. Accordingly, it is preferable that the magnetic detection elements 31A, 31B, 32A and 32B are arranged such that the phase of the first magnetic field calculation signal S1 and the phase of the second magnetic field calculation signal S2 do not coincide.

For example, it is preferable that the magnetic detection elements 31A, 31B, 32A and 32B are arranged at positions other than positions where the angle α formed between the straight line L1 and the line segment $L_{1A}$ and the angle β formed between the straight line L2 and the line segment $L_{2A}$ are different, the angle formed between the magnetosensitive axis of the magnetic detection elements 31A and 31B and the magnetosensitive axis of the magnetic detection elements 32A and 32B (the angle between the straight line L1 and straight line L2) is equal to double the difference between the angle β and the angle α, and the disposition angle γ1 and the disposition angle γ2 are identical (Math. 8, and Math. 9).

In other words, it is preferable that the magnetic detection elements 31A, 31B, 32A and 32B are arranged at positions other than positions where a α≠β, δ=2 (β−α) and γ1=γ2 in FIG. 3A.

As described above, the calculation signal generator 40 calculates the first magnetic field calculation signal S1 by using the first magnetic field signal $S_{1A}$ and second magnetic field signal $S_{1B}$, which are the outputs of the magnetic detection element 31A and magnetic detection element 31B. In addition, the calculation signal generator 40 calculates the second magnetic field calculation signal S2 by using the third magnetic field signal $S_{2A}$ and fourth magnetic field signal $S_{2B}$, which are the outputs of the magnetic detection element 32A and magnetic detection element 32B. When the magnetic detection elements 31A, 31B, 32A and 32B are arranged at positions where a α≠β, δ=2(β−α) and γ1=γ2, there is a case in which the phase of the first magnetic field calculation signal S1 and the phase of the second magnetic field calculation signal S2 coincide and the angle signal Sθ cannot be obtained.

Thus, it is preferable that the magnetic detection elements 31A, 31B, 32A and 32B are arranged at positions other than positions where α≠β, δ=2(β−α) and γ1=γ2.

From the above, the rotation angle sensor 1 can output the angle signal Sθ in which the influence of the disturbance magnetic field Be is reduced.

(1-2) Angle Signal Calculation Method

Hereinafter, an angle signal calculation method, which is executed in the above-described rotation angle sensor 1, will be described by using FIG. 7 while referring to FIG. 1 through FIG. 3A and FIG. 3B.

FIG. 7 is a flowchart for describing an angle signal calculation method of the present embodiment.

The rotation angle sensor 1 acquires a magnetic field in the first direction, which varies by the rotation of the magnet 10, as an output (first magnetic field signal $S_{1A}$) of the magnetic detection element 31A (step S11). The rotation angle sensor 1 acquires a magnetic field in the first direction, which varies by the rotation of the magnet 10, as an output (second magnetic field signal $S_{1B}$) of the magnetic detection element 31B (step S12).

The rotation angle sensor 1 acquires a magnetic field in the second direction, which varies by the rotation of the magnet 10, as an output (third magnetic field signal $S_{2A}$) of the magnetic detection element 32A (step S13). The rotation angle sensor 1 acquires a magnetic field in the second direction, which varies by the rotation of the magnet 10, as an output (fourth magnetic field signal $S_{2B}$) of the magnetic detection element 32B (step S14).

It is preferable that the first magnetic field signal $S_{1A}$ and second magnetic field signal $S_{1B}$, and the third magnetic field signal $S_{2A}$ and fourth magnetic field signal $S_{2B}$, which are acquired in step S11 to step S14, are signals measured at the same timing. There is a case in which the disturbance magnetic field Be1, which is included in the first magnetic field signal $S_{1A}$ and second magnetic field signal $S_{1B}$, and the disturbance magnetic field Be2, which is included in the third magnetic field signal $S_{2A}$ and fourth magnetic field signal $S_{2B}$, vary depending on the timing of measurement. Thus, when the first magnetic field signal $S_{1A}$ to the fourth magnetic field signal $S_{2B}$ are signals measured at the same timing, disturbance magnetic field in the first direction or second direction of the identical disturbance magnetic field Be are included in these signals, and the detection precision of the angle signal Sθ corresponding to the rotation angle θ is improved.

Next, the calculation signal generator 40 calculates a sum or a difference between the first magnetic field signal $S_{1A}$, which is acquired from the magnetic detection element 31A, and the second magnetic field signal $S_{1B}$, which is acquired from the magnetic detection element 31B, and generates the first magnetic field calculation signal S1 (step S15). The calculation signal generator 40 calculates a sum or a difference between the third magnetic field signal $S_{2A}$, which is acquired from the magnetic detection element 32A, and the fourth magnetic field signal $S_{2B}$, which is acquired from the magnetic detection element 32B, and generates the second magnetic field calculation signal S2 (step S16).

At last, the angle signal generator 50 generates the angle signal Sθ indicative of the rotation angle of the magnet 10, based on the first magnetic field calculation signal S1 and the second magnetic field calculation signal S2, and outputs the angle signal Sθ to, for example, a controller of an external device (e.g. a motor) on the outside of the rotation angle sensor 1 (step S17).

Note that the acquisitions of the first magnetic field signal $S_{1A}$, second magnetic field signal $S_{1B}$, third magnetic field signal $S_{2A}$ and fourth magnetic field signal $S_{2B}$ in step S11 to step S14 may be performed simultaneously, or may be performed at different timings or in a different order. In addition, the calculations in step S15 and step S16 may be performed simultaneously, or may be performed at different timings or in a different order, if step S15 is executed after step S11 and step S12, and step S16 is executed after step S13 and step S14.

The above-described rotation angle sensor 1 includes, for example, at least one processor. In the rotation angle sensor 1, the processor functions as the calculation signal generator 40 and the angle signal generator 50, by executing an angle signal calculation method including: acquiring a magnetic field in a first direction, which varies by the rotation of the magnet 10 that is polarized into at least two poles in a direction perpendicular to the rotational axis 11A and is disposed to be rotatable around the rotational axis 11A, as the first magnetic field signal $S_{1A}$ which is an output of the magnetic detection element 31A; acquiring a magnetic field in the first direction as an output of the magnetic detection element 31B disposed at a position different from a position of the position of the magnetic detection element 31A and at a position where the first disposition angle, relative to the magnetic detection element 31A, is greater than 0 degrees and less than 90 degrees; acquiring magnetic field in a second direction different from the first direction as the third magnetic field signal $S_{2A}$ that is the output of the magnetic detection element 32A and the fourth magnetic field signal $S_{2B}$ that is the output of the magnetic detection element 32B; outputting the first magnetic field calculation signal S1, based on the first magnetic field signal $S_{1A}$ that is the output of the magnetic detection element 31A and the second magnetic field signal $S_{1B}$ that is the output of the magnetic detection element 31B; outputting the second magnetic field calculation signal S2 which differs in phase from the first magnetic field calculation signal S1, based on the third magnetic field signal $S_{2A}$ that is the output of the magnetic detection element 32A and the fourth magnetic field signal $S_{2B}$ that is the output of the magnetic detection element 32B; and generating the angle signal Sθ indicative of the rotation angle θ of the magnet 10, based on the first magnetic field calculation signal S1 and the second magnetic field calculation signal S2.

Here, the first disposition angle is, in plan view, a smaller angle of the angles formed by the line segment $L_{1A}$, which connects the rotational axis 11A of the magnet 10 and the magnetic detection element 31A, and the line segment $L_{1B}$, which connects the magnetic detection element 31B and the rotational axis 11A, or is, in cross-sectional view, a smaller angle of the angles formed by the line segment $L_{1A}'$ which connects the magnetic detection element 31A and the center O' of the magnet 10, and the line segment $L_{1B}'$ which connects the magnetic detection element 31B and the center O'.

(1-3) Program

Hereinafter, a program for an angle signal calculation process, which is executed in the rotation angle detector 20 of the rotation angle sensor 1, will be described. The rotation angle detector 20 generates and outputs the angle signal Sθ corresponding to the rotation angle θ, according to a program which causes a computer to execute the steps (a) to (f) described below. The program described below is stored in a computer readable medium, for example, an optical disc such as a DVD disc or a Blu-ray (trademark) disc, a hard disk drive, a memory, or the like. The program described below may be distributed via the Internet. Further, the program below may be stored in a cloud server, and the respective steps may be executed via the Internet.

(a) acquiring a magnetic field in a first direction, which varies by the rotation of the magnet 10 which is polarized into at least two poles in a direction perpendicular to the rotational axis 11A and is disposed to be rotatable around the rotational axis 11A, as the first magnetic field signal $S_{1A}$ which is an output of the magnetic detection element 31A;

(b) acquiring a magnetic field in the first direction as an output of the magnetic detection element 31B disposed at a position different from a position of the magnetic detection element 31A and at a position where the first disposition angle, relative to the magnetic detection element 31A, is greater than 0 degrees and less than 90 degrees;

(c) acquiring a magnetic field in a second direction different from the first direction as the third magnetic field signal $S_{2A}$ that is the output of the magnetic detection element 32A disposed at a position different from the position of the magnetic detection element 31A, and the fourth magnetic field signal $S_{2B}$ that is the output of the magnetic detection element 32B;

(d) outputting the first magnetic field calculation signal S1, based on the first magnetic field signal $S_{1A}$ that is the output of the magnetic detection element 31A and the second magnetic field signal $S_{1B}$ that is the output of the magnetic detection element 31B;

(e) outputting the second magnetic field calculation signal S2 which differs in phase from the first magnetic field calculation signal S1, based on the third magnetic field signal $S_{2A}$ that is the output of the magnetic detection element 32A and the fourth magnetic field signal $S_{2B}$ that is the output of the magnetic detection element 32B; and (f) generating the angle signal Sθ indicative of the rotation angle θ of the magnet 10, based on the first magnetic field calculation signal S1 and the second magnetic field calculation signal S2.

Here, the first disposition angle is, in plan view, a smaller angle of the angles formed by the line segment $L_{1A}$, which connects the rotational axis 11A of the magnet 10 and the magnetic detection element 31A, and the line segment $L_{1B}$, which connects the magnetic detection element 31B and the rotational axis 11A, or is, in cross-sectional view, a smaller angle of the angles formed by the line segment $L_{A}'$ which connects the magnetic detection element 31A and the center O' of the magnet 10, and the line segment $L_{B}'$ which connects the magnetic detection element 31B and the center O'.

Advantageous Effects of First Embodiment

In the rotation angle sensor 1 according to the first embodiment, the following advantageous effects are obtained.

(1) The rotation angle sensor 1 includes two magnetic detection elements which detect a magnetic field in a first direction, and two magnetic detection elements which detect a magnetic field in a second direction different from the first direction, and calculates a sum or a difference between the outputs of the magnetic detection elements which detect the magnetic field in an identical direction, at a time of detecting the rotation angle θ of the magnet 10. The rotation angle sensor 1 detects an angle signal Sθ corresponding to the rotation angle θ, by using the sum or difference between the outputs of the magnetic detection elements which detect the magnetic field in the identical direction. Thus, even in a case of use in an environment in which disturbance magnetic flux occurs, the rotation angle sensor 1 can reduce the influence of the disturbance magnetic flux, and can detect the rotation angle of the magnet with high precision.

(2) In the rotation angle sensor 1, the two magnetic detection elements, which detect the magnetic field in the identical direction, are arranged such that the angle between the two magnetic detection elements is greater than 0 degrees and less than 180 degrees. Thus, even if the calculation for eliminating the disturbance magnetic field is performed, it is possible to obtain the first magnetic field calculation signal S1 and second magnetic field calculation signal S2 which are used in the calculation of the angle signal Sθ.

(3) In the rotation angle sensor 1, it is preferable that the two magnetic detection elements, which detect the magnetic field in the identical direction, are arranged such that the angle between the two magnetic detection elements is greater than 0 degrees and not greater than 90 degrees. Thereby, when the angle between the two magnetic detection elements, which detect the magnetic field in the identical direction, is 90 degrees, the angle signal Sθ becomes maximum, and the influence of the disturbance magnetic field becomes smaller as the angle becomes smaller, and the precision of the angle signal Sθ is enhanced.

2. Second Embodiment

A rotation angle sensor 2 according to a second embodiment will be described in detail, by using FIG. 8 to FIG. 10, while referring to FIG. 1 to FIG. 7. In the present embodiment, a case is described in which the first direction of the magnetic field, which the rotation angle sensor 2 detects, is a direction perpendicular to the rotational axis of the rotational axis 11A, and the second direction is a direction parallel to the rotational axis of the rotational axis 11A. In the present embodiment, a description is given on the assumption that the "first direction" is the X-axis direction, and the "second direction" is the Z-axis direction.

Figure 8:
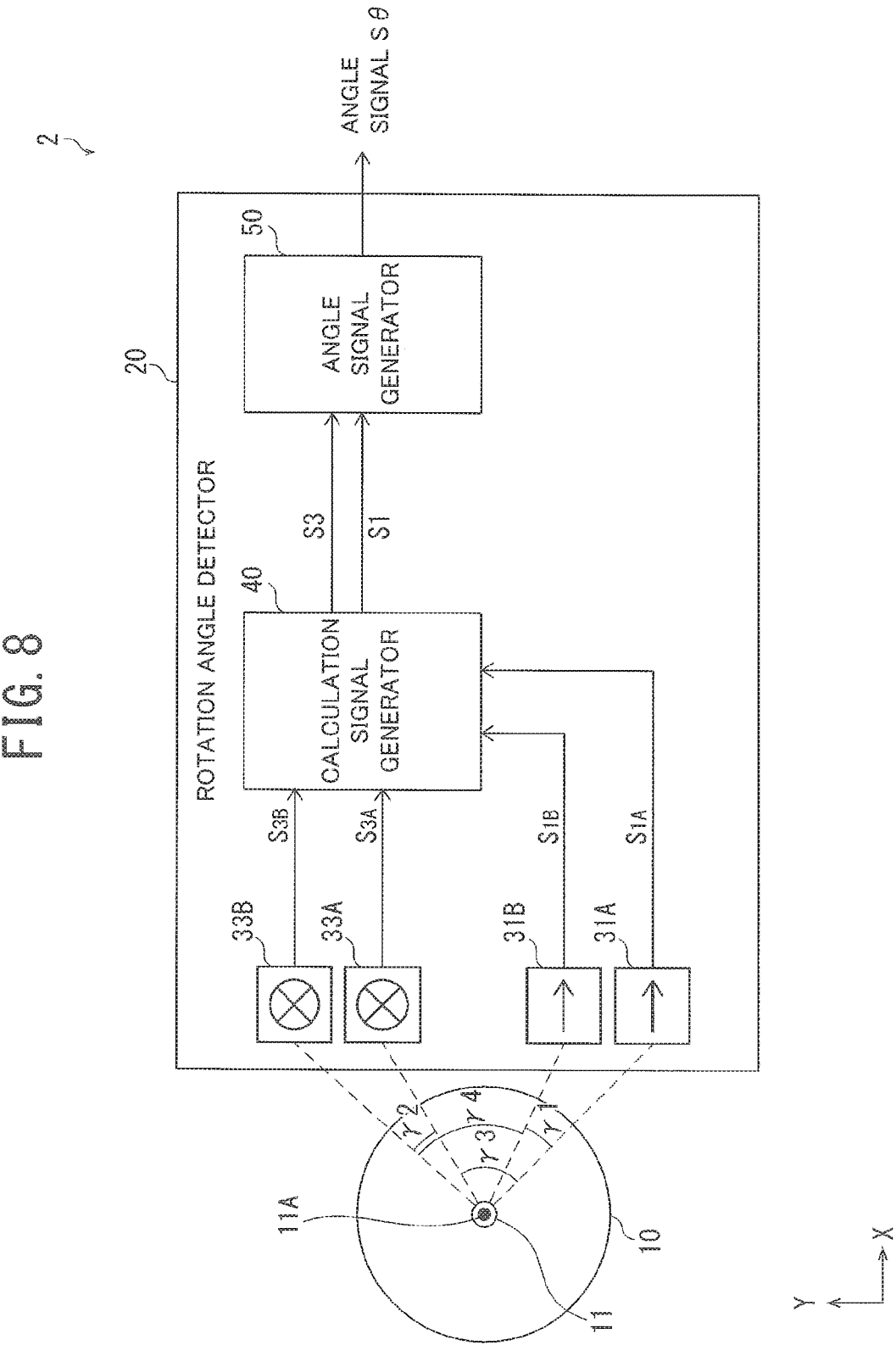
FIG. 8 is a block diagram illustrating an example of a configuration of a magnet and a rotation angle detector in a rotation angle sensor according to a second embodiment.

As illustrated in FIG. 8, the rotation angle sensor 2 includes magnetic detection elements 31A, 31B, 33A and 33B, a magnet 10, a calculation signal generator 40, and an angle signal generator 50. Specifically, the rotation angle sensor 2 differs from the rotation angle sensor 1 according to the first embodiment in that the rotation angle sensor 2 includes the magnetic detection elements 33A and 33B which detect magnetic fields in the Z-axis direction, in place of the magnetic detection elements 32A and 32B.

Hereinafter, the magnetic detection elements 33A and 33B will be described in detail. Besides, since the magnetic detection elements 31A and 31B, magnet 10, calculation signal generator 40 and angle signal generator 50 have the same structures as in the corresponding parts of the rotation angle sensor 1 according to the first embodiment, a description thereof is omitted.

(Magnetic Detection Elements)

The magnetic detection elements 31A and 31B are elements which detect magnetic field in the first direction (X-axis direction). The magnetic detection elements 31A and 31B output a first magnetic field signal $S_{1A}$ and a second magnetic field signal $S_n$ corresponding to the rotation angle θ of the magnet 10.

The magnetic detection elements 33A and 33B are elements which detect the magnetic field in the second direction (Z-axis direction). The magnetic detection element 33A outputs a fifth magnetic field signal $S_{3A}$ corresponding to a magnetic field $B_{3A}$ in the second direction, which is input to the magnetic detection element 33A at a detection timing. The magnetic detection element 33B outputs a sixth magnetic field signal $S_{3B}$ corresponding to a magnetic field $B_{3B}$ in the second direction, which is input to the magnetic detection element 33B at a detection timing.

The fifth magnetic field signal $S_{3A}$ and sixth magnetic field signal $S_{3B}$ are, for example, signals indicative of voltage. Analog voltage signals detected by the magnetic detection elements 33A and 33B are amplified in signal level and are converted to digital signals in an amplificator (not illustrated) and an AD conversor (not illustrated), and are output as the fifth magnetic field signal $S_{3A}$ and sixth magnetic field signal $S_{3B}$.

When the disturbance magnetic field Be occurs at arrangement positions of the magnetic detection elements 33A and 33B, the magnetic detection elements 33A and 33B output the fifth magnetic field signal $S_{3A}$ and sixth magnetic field signal $S_{3B}$, respectively, which correspond to a composite magnetic field in the second direction (Z-axis direction) of a composite magnetic field between the magnetic field Br and the disturbance magnetic field Be.

The magnetic detection elements 33A and 33B may detect the magnetic field in the second direction, with an identical direction of the second direction (Z-axis direction) being set as forward directions for the magnetic detection elements 33A and 33B, or may detect the magnetic field in the second direction, with opposite directions of the second direction being set as forward directions for the magnetic detection elements 33A and 33B.

(Arrangement of Magnetic Detection Elements)

Figure 9:
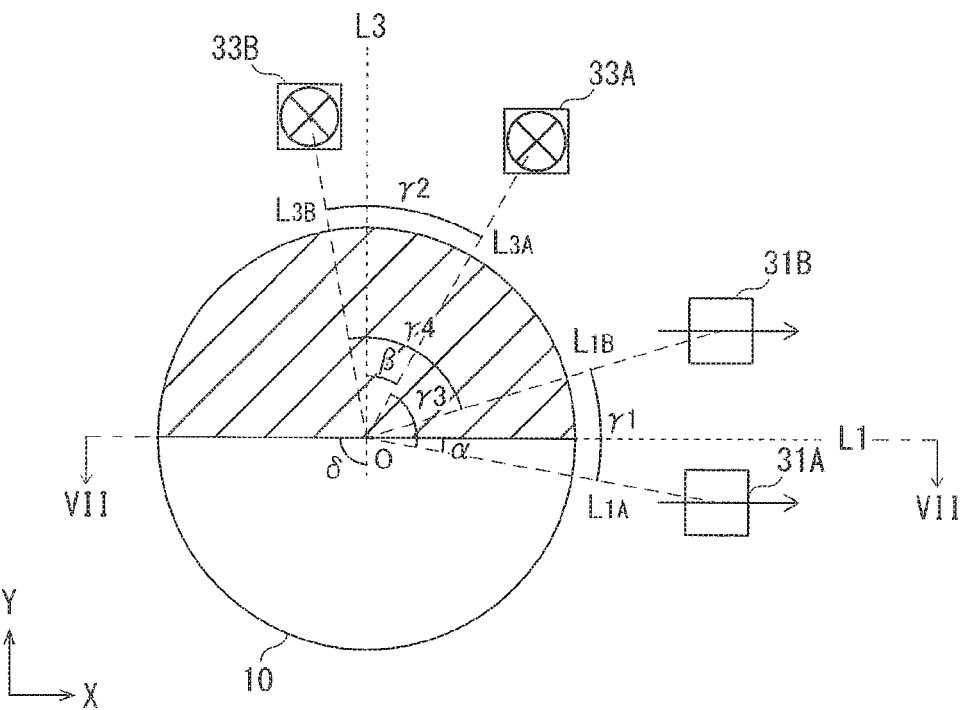
FIG. 9 is a plan view illustrating an arrangement relationship between magnetic detection elements and the magnet in the rotation angle sensor according to the second embodiment.

FIG. 9 illustrates an arrangement relationship between the magnetic detection elements 31A and 31B which detect magnetic field in the first direction Br that the magnet 10 generates, the magnetic detection elements 33A and 33B which detect magnetic field in the second direction Br, and the magnet 10.

The magnetic detection elements 33A and 33B are disposed in place of the magnetic detection elements 32A and 32B of the rotation angle sensor 1. The arrangement relationship between the magnetic detection elements 31A and 31B and the magnetic detection elements 33A and 33B is similar to the arrangement relationship between the magnetic detection elements 31A and 31B and the magnetic detection elements 32A and 32B of the rotation angle sensor 1.

Specifically, the magnetic detection element 33A and the magnetic detection element 33B are arranged in a manner to have a disposition angle γ2 (an example of a second disposition angle). The magnetic detection element 31B and the magnetic detection element 33B are arranged in a manner to have a disposition angle γ4 (an example of a fourth disposition angle).

The magnetic detection element 33A is disposed at a position of –β degrees with respect to a straight line L3 which passes through the rotational center O of the magnet 10 and is perpendicular to the magnetosensitive axes of the magnetic detection elements 33A and 33B.

A description will be given of outputs of the magnetic detection elements 33A and 33B arranged as illustrated in FIG. 9. Here, it is assumed that a uniform disturbance magnetic field Be occurs at the arrangement position of each element.

The magnetic detection element 33A detects a magnetic field in the second direction (Z-axis direction). The magnetic detection element 33A is disposed at the disposition angle γ3, relative to the magnetic detection element 31A. Thus, the magnetic detection element 33A outputs a magnetic field expressed by (Math. 12) equation as the fifth magnetic field signal $S_{3A}$ corresponding to the rotation angle θ of the magnet 10. Here, Be2 is a disturbance magnetic field in the second direction (a second-directional component of the disturbance magnetic field Be).

$$S_{3A}=\cos(\theta+\delta-\beta)+Be2 \qquad \text{(Math. 12)}$$

The magnetic detection element 33B is disposed at the disposition angle γ2, relative to the magnetic detection element 33A, and detects the magnetic field in the second direction. Thus, the magnetic detection element 33B outputs a magnetic field expressed by (Math. 13) equation as the sixth magnetic field signal $S_{3B}$ corresponding to the rotation angle θ of the magnet 10.

$$S_{3B}=\cos(\theta+\delta-\beta+\gamma2)+Be2 \qquad \text{(Math. 13)}$$

In the rotation angle sensor 2, in order to generate the angle signal Sθ indicative of the rotation angle θ of the magnet 10, the magnetic detection elements 31A and 31B, which detect the magnetic field in the first direction perpendicular to the rotational axis 11A, and the magnetic detection elements 33A and 33B, which detect the magnetic field in the second direction parallel to the rotational axis 11A, are arranged in a manner to meet the following arrangement conditions.

(a) First Arrangement Condition of Magnetic Detection Elements

The first arrangement condition of the magnetic detection elements is the same as the first arrangement condition described in the first embodiment.

The magnetic detection elements 31A, 31B, 33A and 33B are arranged at positions where the disposition angles γ1 and γ2 are greater than 0 degrees and less than 180 degrees, and it is more preferable that at least one of the disposition angles γ1 and γ2 is greater than 0 degrees and not greater than 90 degrees.

This aims at preventing the magnetic fields generated by the magnet 10 from being canceled along with the disturbance magnetic fields, when the calculation for canceling the disturbance magnetic fields is performed in the calculation signal generator 40. As the disposition angles γ1 and γ2 become closer to 90 degrees, the angle signal Sθ that is output from the rotation angle sensor 2 becomes greater, and, in the case of 90 degrees, the angle signal Sθ becomes maximum, and this is preferable.

(b) Second Arrangement Condition of Magnetic Detection Elements

The magnetic detection elements 31A and 31B are disposed at non-line-symmetric positions with respect to the straight line L1 which passes through the rotational center O of the magnet 10 and is parallel to the magnetosensitive axes of the magnetic detection elements 31A and 31B. In addition, the magnetic detection elements 33A and 33B are disposed at non-line-symmetric positions with respect to the straight line L3 which passes through the rotational center O of the magnet 10 and is perpendicular to the magnetosensitive axes of the magnetic detection elements 33A and 33B.

When the magnetic detection elements 31A and 31B are disposed at line-symmetric positions with respect to the straight line L1, and the magnetic detection elements 33A and 33B are disposed at line-symmetric positions with respect to the straight line L3, the phases of the first magnetic field calculation signal S1 and third magnetic field calculation signal S3, which are outputs of the calculation signal generator 40, coincide, and the angle signal Sθ indicative of the rotation angle θ of the magnet 10 cannot be generated.

(c) Third Arrangement Condition of Magnetic Detection Elements

Figure 10:
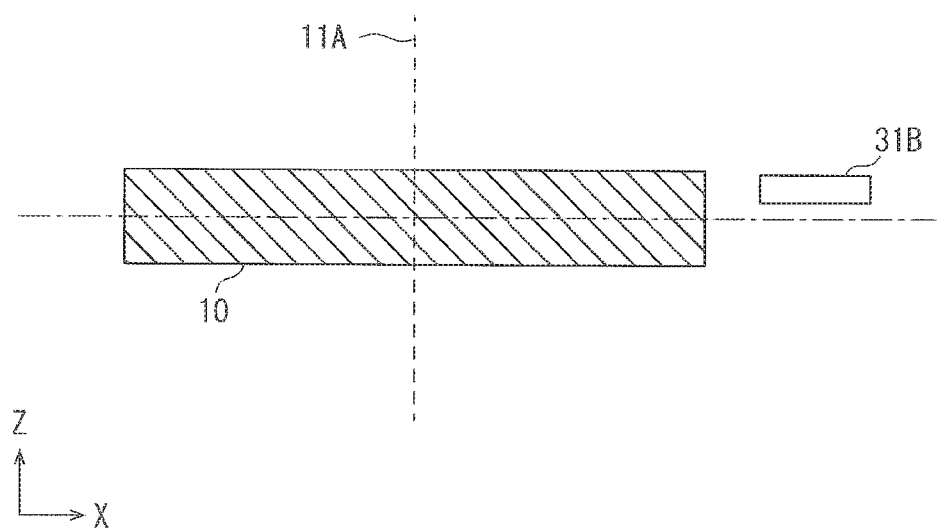
FIG. 10 is a cross-sectional view illustrating an arrangement relationship between the magnetic detection elements and the magnet in the rotation angle sensor according to the second embodiment.

FIG. 10 is a cross-sectional view taken along line VII-VII in FIG. 9.

In the rotation angle sensor 2 using the magnetic detection elements 33A and 33B which detect the magnetic field in a direction parallel to the rotational axis 11A, the magnetic detection element 31A is disposed at a position where a magnetosensitive plane of the magnetic detection element 31A deviates from the center in the thickness of the magnet 10. Here, the "thickness of the magnet 10" means a distance in the direction of the rotational axis 11A of the magnet 10.

The magnetic detection element 31B, magnetic detection element 33A and magnetic detection element 33B are similarly disposed at positions where the magnetosensitive plane of each element deviates from the center in the thickness of the magnet 10.

(d) Fourth Arrangement Condition of Magnetic Detection Elements

It is preferable that the magnetic detection elements 31A, 31B, 33A and 33B are arranged at positions where the disposition angle γ3 and disposition angle γ4 are different from the angle δ formed between the first direction and second direction, and the disposition angle γ1 and disposition angle γ2 are different.

(Calculation Signal Generator)

The calculation signal generator 40 performs calculations, based on the outputs of the magnetic detection elements 31A, 31B, 33A and 33B, and outputs a first magnetic field calculation signal S1 and a third magnetic field calculation signal S3.

The calculation signal generator 40 calculates a difference between the first magnetic field signal $S_{1A}$ and the second magnetic field signal $S_{1B}$.

Thereby, as illustrated in (Math. 14) equation, the calculation signal generator 40 can generate the first magnetic field calculation signal S1 in which the disturbance magnetic field Be1 in the first direction included in the first magnetic field signal $S_{1A}$ and the second magnetic field signal $S_{1B}$ is reduced.

(Math. 14) equation is identical to (Math. 8) equation.

$$\begin{aligned} S1 &= S_{1B} - S_{1A} \\ &= [\cos\{\theta + 2(\gamma1 - \alpha)\} + Be1] - \\ &\quad \{\cos(\theta - 2\alpha) + Be1\} \\ &= \cos(\theta - 2\alpha + 2\cdot\gamma1) - \cos(\theta - 2\alpha) \end{aligned} \quad \text{(Math. 14)}$$

The calculation signal generator 40 performs such a calculation that the disturbance magnetic field Be2, which is included in the output of the magnetic detection element 33A, and the disturbance magnetic field Be2, which is included in the output of the magnetic detection element 33B, have opposite signs, thereby generating the third magnetic field calculation signal S3.

The calculation signal generator 40 calculates a difference between the fifth magnetic field signal $S_{3A}$, which is the output of the magnetic detection element 33A, and the sixth magnetic field signal $S_{3B}$, which is the output of the magnetic detection element 33B. Thereby, as illustrated in (Math. 15) equation, the calculation signal generator 40 generates the third magnetic field calculation signal S3 in which the disturbance magnetic field Be2 in the second direction included in the fifth magnetic field signal $S_{3A}$ and the sixth magnetic field signal $S_{3B}$ is reduced, and which differs in phase from the first magnetic field calculation signal S1.

$$\begin{aligned} S3 &= S_{3B} - S_{3A} \\ &= \{\cos(\theta + \delta - \beta + \gamma2) + Be2\} - \\ &\quad \{\cos(\theta + \delta - \beta) + Be2\} \\ &= \cos(\theta + \delta - \beta + \gamma2) - \cos(\theta + \delta - \beta) \end{aligned} \quad \text{(Math. 15)}$$

As illustrated in (Math. 14) to (Math. 15) equations, the first magnetic field calculation signal S1 and third magnetic field calculation signal S3, which are calculated by the calculation signal generator 40, do not include the disturbance magnetic field. In addition, the phase of the third magnetic field calculation signal S3 differs from the phase of the first magnetic field calculation signal S1.

The calculation signal generator 40 outputs the first magnetic field calculation signal S1 and third magnetic field calculation signal S3 to the angle signal generator 50.

Note that when the magnetic detection elements 33A and 33B detect the magnetic field in the second direction, with different directions of the second direction being set as the forward directions, the calculation signal generator 40 calculates a sum between the fifth magnetic field signal $S_{3A}$, which is the output of the magnetic detection element 33A, and the sixth magnetic field signal $S_{3B}$, which is the output of the magnetic detection element 33B. Thereby, the third magnetic field calculation signal S3, in which the disturbance magnetic field is canceled, is generated.

From the above, the rotation angle sensor 2 can output the angle signal Sθ in which the influence of the disturbance magnetic field Be is reduced.

Advantageous Effects of Second Embodiment

In the rotation angle sensor 2 according to the second embodiment, the following advantageous effect is obtained, in addition to the advantageous effects described in the first embodiment.

(4) The rotation angle sensor 2 can output the angle signal Sθ corresponding to the rotation angle θ of the magnet 10, by detecting not only the magnetic field in the direction parallel to the rotational surface of the magnet 10, but also the magnetic field in the direction perpendicular to the rotational surface of the magnet 10.

3. Third Embodiment

A rotation angle sensor 3 according to a third embodiment will be described in detail, by using FIG. 11 to FIG. 13, while referring to FIG. 1 to FIG. 7. In the present embodiment, a case is described in which the rotation angle sensor 3 includes a biaxial magnetic detection element which can detect magnetic fields in two directions, i.e. an X-axis direction that is a first direction, and a Z direction that is a second direction different from the first direction.

<Configuration of Rotation Angle Sensor>

Figure 11:
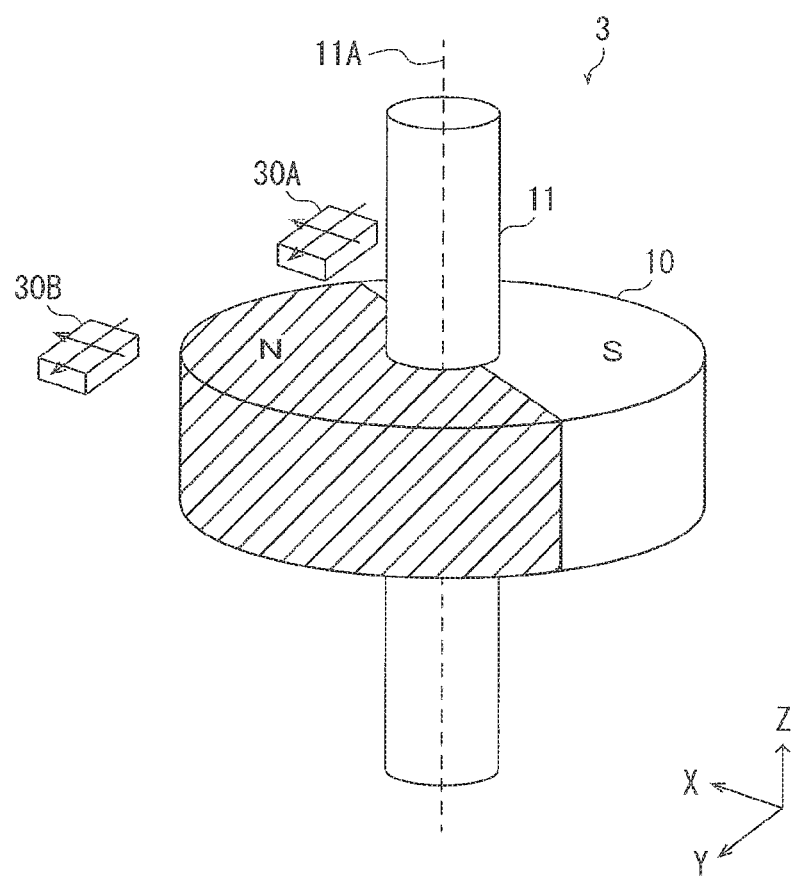
FIG. 11 is a schematic view illustrating a configuration example of a rotation angle sensor according to a third embodiment.
Figure 12:
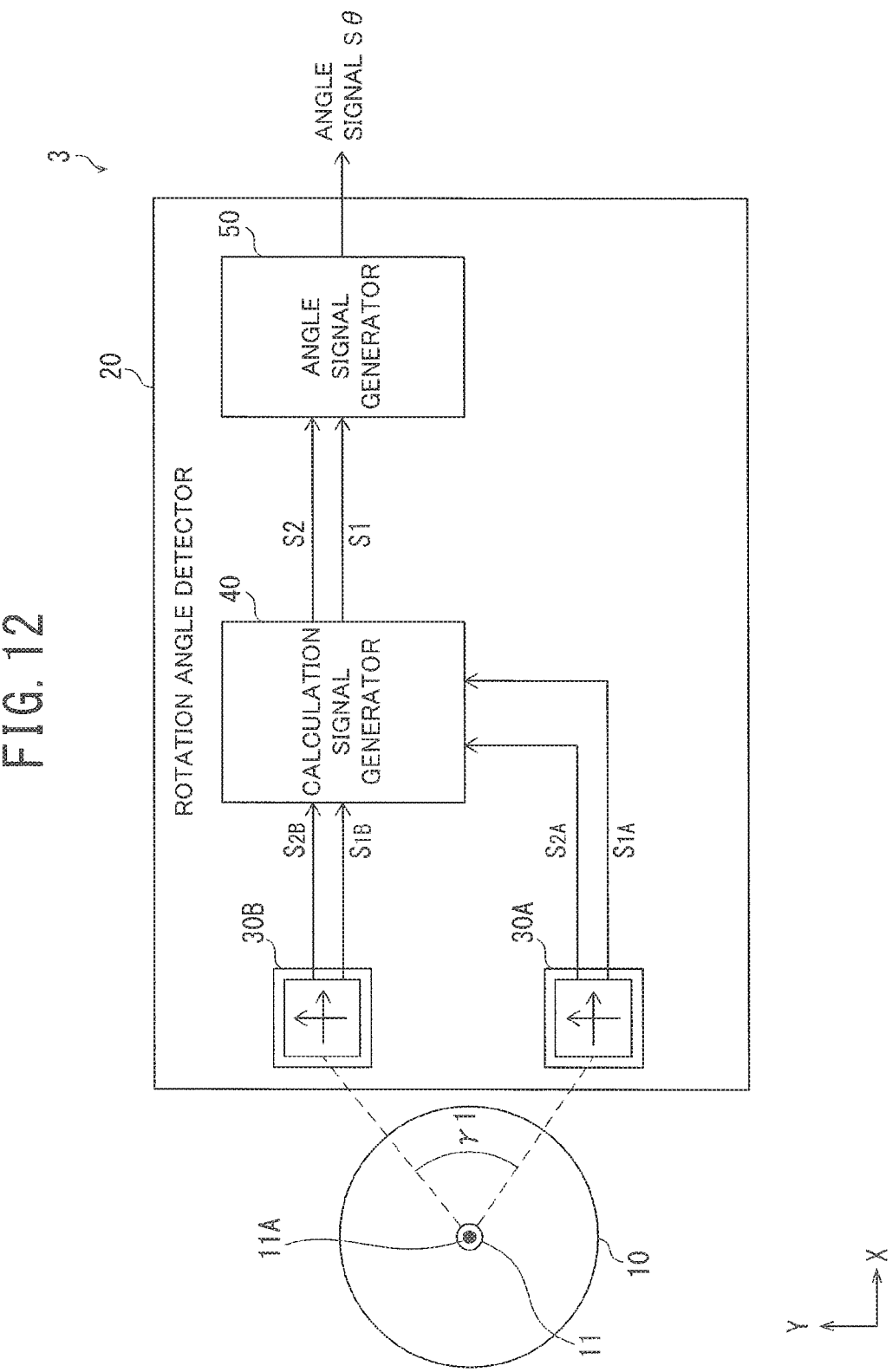
FIG. 12 is a block diagram illustrating an example of a configuration of a magnet and a rotation angle detector in the rotation angle sensor according to the third embodiment.

FIG. 11 illustrates an example of a configuration of the rotation angle sensor 3. The rotation angle sensor 3 includes biaxial magnetic detection elements 30A and 30B, a magnet 10, a calculation signal generator 40, and an angle signal generator 50 (in FIG. 11, the calculation signal generator 40 and angle signal generator 50 are not illustrated). Specifically, the rotation angle sensor 3 differs from the rotation angle sensor 1 according to the first embodiment in that the rotation angle sensor 3 includes the biaxial magnetic detection element 30A in place of the magnetic detection elements 31A and 32A, and includes the biaxial magnetic detection element 30B in place of the magnetic detection elements 31B and 32B.

Hereinafter, the biaxial magnetic detection elements 30A and 30B will be described in detail. Besides, since the magnet 10, calculation signal generator 40 and angle signal generator 50 have the same structures as in the corresponding parts of the rotation angle sensor 1 according to the first embodiment, a description thereof is omitted.

<Biaxial Magnetic Detection Elements>

The biaxial magnetic detection element 30A, 30B is a magnetic detection element which can detect magnetic fields in two directions, i.e. an X-axis direction that is a first direction, and a Z direction that is a second direction different from the first direction.

The biaxial magnetic detection element 30A includes a magnetic detection element 31A and a magnetic detection element 32A, which detect magnetic fields in different directions. The magnetic detection element 31A is an element disposed to be capable of detecting the magnetic field in the X-axis direction, and the magnetic detection element 32A is an element disposed to be capable of detecting the magnetic field in the Z-axis direction.

The biaxial magnetic detection element 30A outputs a first magnetic field signal $S_{1A}$ corresponding to the magnetic field $B_{1A}$ in the X-axis direction, which is input to the biaxial magnetic detection element 30A at a detection timing, and a third magnetic field signal $S_{2A}$ corresponding to the magnetic field $B_{2A}$ in the Y-axis direction, which is input to the biaxial magnetic detection element 30A at the detection timing. The first magnetic field signal $S_{1A}$ and the third magnetic field signal $S_{2A}$ are signals corresponding to the rotation angle θ of the magnet 10 at the detection timing.

The biaxial magnetic detection element 30B includes a magnetic detection element 31B and a magnetic detection element 32B, which detect magnetic fields in different directions. The magnetic detection element 31B is an element disposed to be capable of detecting the magnetic field in the X-axis direction, and the magnetic detection element 32A is an element disposed to be capable of detecting the magnetic field in the Z-axis direction.

The biaxial magnetic detection element 30B outputs a second magnetic field signal $S_{1B}$ corresponding to the magnetic field $B_{1B}$ in the X-axis direction, which is input to the biaxial magnetic detection element 30B at a detection timing, and a fourth magnetic field signal $S_{2B}$ corresponding to the magnetic field $B_{2B}$ in the Y-axis direction, which is input to the biaxial magnetic detection element 30B at the detection timing. The second magnetic field signal $S_{1B}$ and the fourth magnetic field signal $S_{2B}$ are signals corresponding to the rotation angle θ of the magnet 10 at the detection timing.

The magnetic detection elements 31A, 31B, 32A and 32B are, for example, magnetoresistive elements.

In addition, each of the biaxial magnetic detection elements 30A and 30B may include, for example, a magnetic convergence plate and a plurality of Hall elements.

The biaxial magnetic detection element 30A may be an element in which two magnetic detection elements (magnetic detection element 31A and magnetic detection element 32A) are formed as one piece. Besides, the biaxial magnetic detection element 30A may be a device including the magnetic detection element 31A and magnetic detection element 32A, which are separately formed.

When the biaxial magnetic detection element 30A is formed such that the magnetic detection element 31A and magnetic detection element 32A are formed as one piece, i.e. formed on an identical substrate, it is preferable that the magnetic detection element 31A and magnetic detection element 32A are formed in a region of the substrate, which is closer to the magnet 10. In this case, the magnetic field that is detected increases, and the output of the rotation angle sensor 3 increases, and this is preferable.

In addition, it is preferable that the magnetic detection element 31A and magnetic detection element 32A are formed in adjacent regions on the substrate. This is preferable because the difference between values of the disturbance magnetic field Be, which are input to the magnetic detection element 31A and magnetic detection element 32A, decreases, and the effect of elimination of the disturbance magnetic field in the rotation angle sensor 3 is enhanced.

The same applies to the biaxial magnetic detection element 30B.

<Arrangement of Biaxial Magnetic Detection Elements and Magnet>

Figure 13:
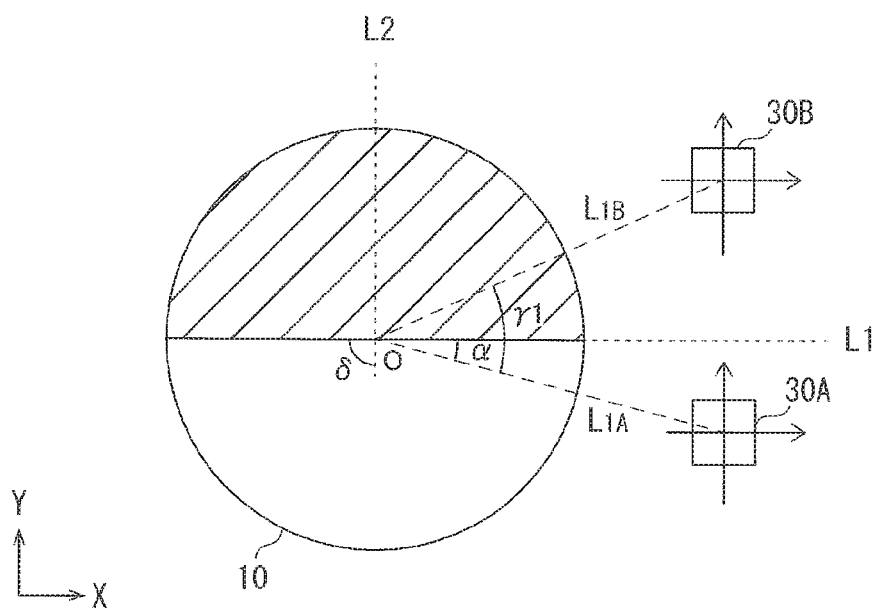
FIG. 13 is a plan view illustrating an arrangement relationship between magnetic detection elements and the magnet in the rotation angle sensor according to the third embodiment.

FIG. 13 illustrates an example of a configuration in plan view of the rotation angle sensor 3. Hereinafter, referring to FIG. 13, a description will be given of the arrangement of the biaxial magnetic detection elements 30A and 30B and the magnet 10 in the rotation angle sensor 3.

As illustrated in FIG. 13, the biaxial magnetic detection elements 30A and 30B are arranged in a manner to have a disposition angle γ1. FIG. 13 illustrates an example in which the biaxial magnetic detection element 30A is disposed at a position of −α degrees with respect to a straight line L1 which passes through the rotational center O of the magnet 10 and is parallel to the magnetosensitive axes in the X-axis direction of the biaxial magnetic detection elements 30A and 30B.

At this time, the biaxial magnetic detection element 30A outputs magnetic field signals expressed by (Math. 16) and (Math. 17) equations, as the first magnetic field signal $S_{1A}$ and third magnetic field signal $S_{2A}$ corresponding to the rotation angle θ of the magnet 10 at the detection timing. Here, Be1 is the disturbance magnetic field in the X-axis direction (the X-axis-directional component of the disturbance magnetic field Be), and Be2 is the disturbance magnetic field in the Y-axis direction (the Y-axis-directional component of the disturbance magnetic field Be).

$$S_{1A} = \cos(\theta - 2\alpha) + Be1 \quad \text{(Math. 16)}$$

$$S_{2A} = \cos\{\theta + \delta - 2(\delta + \alpha)\} + Be2 \quad \text{(Math. 17)}$$
$$= \cos(\theta - \delta - 2\alpha) + Be2$$

In addition, the biaxial magnetic detection element 30B outputs the second magnetic field signal $S_{1B}$ and fourth magnetic field signal $S_{2B}$ expressed by (Math. 18) and (Math. 19) equations, as the second magnetic field signal $S_{1B}$ and fourth magnetic field signal $S_{2B}$ corresponding to the rotation angle θ of the magnet 10 at the detection timing.

$$S_{1B} = \cos\{\theta + 2(\gamma 1 - \alpha)\} + Be1 \quad \text{(Math. 18)}$$

$$S_{2B} = \cos\{\theta + \delta - 2(\delta + \alpha - \gamma 1)\} + Be2 \quad \text{(Math. 19)}$$
$$= \cos\{\theta - \delta + 2(\gamma 1 - \alpha)\} + Be2$$

Note that, at a time of 5=90°, a third magnetic field signal $S_{2A}$ and a fourth magnetic field signal $S_{2B}$, which are expressed by (Math. 17') and (Math. 19'), are output as the third magnetic field signal $S_{2A}$ and fourth magnetic field signal $S_{2B}$.

$$S_{2A} = \sin(\theta - \delta - 2\alpha) + Be2 \quad \text{(Math. 17')}$$

$$S_{2B} = \sin\{\theta - \delta + 2(\gamma 1 - \alpha)\} + Be2 \quad \text{(Math. 19')}$$

In the rotation angle sensor 3, in order to generate the angle signal Sθ indicative of the rotation angle θ of the magnet 10, the biaxial magnetic detection elements 30A and 30B are arranged in a manner to meet the following arrangement condition.

(a) First Arrangement Condition of Biaxial Magnetic Detection Elements

The biaxial magnetic detection elements 30A and 30B are disposed at non-line-symmetric positions with respect to the straight lines L1 and L2 which pass through the rotational axis 11A of the magnet 10 and are parallel to the magnetic field detection directions (X-axis direction and Z-axis direction) of the biaxial magnetic detection element 30A or the biaxial magnetic detection element 30B.

Thereby, the rotation angle sensor 3 can generate the angle signal Sθ indicative of the rotation angle θ of the magnet 10.

(Calculation Signal Generator)

The calculation signal generator 40 performs calculations, based on the outputs of the biaxial magnetic detection elements 30A and 30B, and outputs a first magnetic field calculation signal S1 and a second magnetic field calculation signal S2. Like the calculation signal generator 40 of the first embodiment, the calculation signal generator 40 generates the first magnetic field calculation signal S1 by calculating a sum or a difference between the first magnetic field signal $S_{1A}$ and the second magnetic field signal $S_{1B}$, and generates the second magnetic field calculation signal S2 by calculating a sum or a difference between the third magnetic field signal $S_{2A}$ and the fourth magnetic field signal $S_{2B}$. By the calculation signal generator performing the above calculations, the disturbance magnetic field Be included in the outputs of the biaxial magnetic detection elements 30A and 30B can be reduced.

(Angle Signal Generator)

Based on the first magnetic field calculation signal S1 and second magnetic field calculation signal S2, the angle signal generator 50 generates an angle signal Sθ indicative of the rotation angle of the magnet 10, and outputs the angle signal Sθ to a controller of an external device (e.g. a motor) on the outside of the rotation angle sensor 3.

The angle signal generator 50 calculates the rotation angle θ of the magnet 10, based on a signal obtained by rotating the magnet 10 by one revolution, the arrangement positions of the respective elements (disposition angles α, γ1), and an angle δ formed by magnetosensitive axes, and generates an angle signal indicative of the rotation angle θ.

From the above, the rotation angle sensor 3 can output the angle signal Sθ in which the influence of the disturbance magnetic field Be is reduced.

Advantageous Effects of Third Embodiment

In the rotation angle sensor 3 according to the third embodiment, the following advantageous effect is obtained, in addition to the advantageous effects described in the first embodiment.

(5) The rotation angle sensor 3 employs the biaxial magnetic detection element which can detect magnetic fields in at least two directions. When the biaxial magnetic detection element, in which magnetic detection elements capable of detecting magnetic fields in different directions are formed as one piece (on an identical substrate), is used, the magnetic detection elements capable of detecting magnetic fields in different directions are disposed adjacent to each other, and therefore the precision of the angle signal Sθ is improved.

4. Fourth Embodiment

Figure 14:
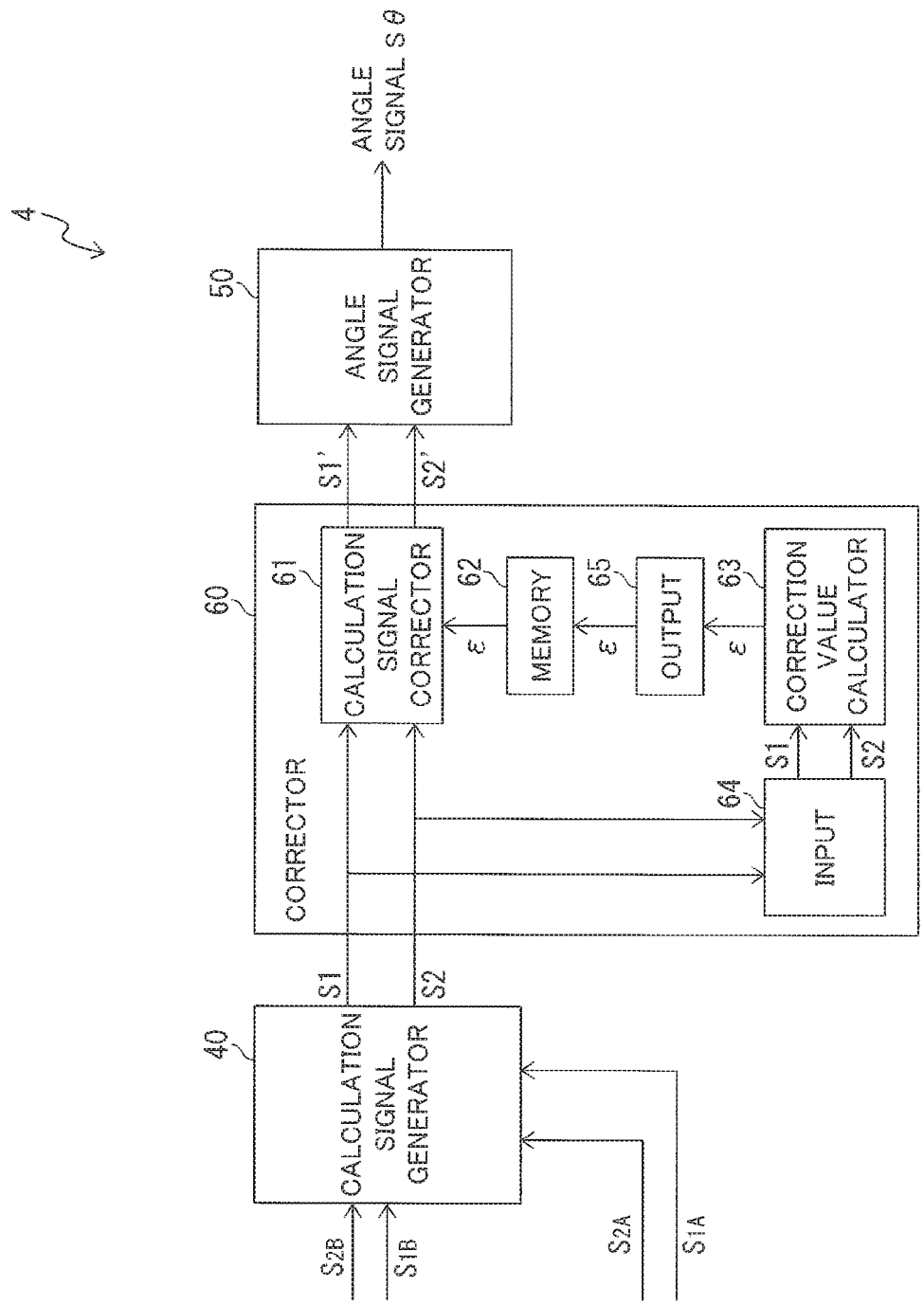
FIG. 14 is a block diagram illustrating an example of a configuration of a magnet and a rotation angle detector in a rotation angle sensor according to a fourth embodiment.
Figure 15:
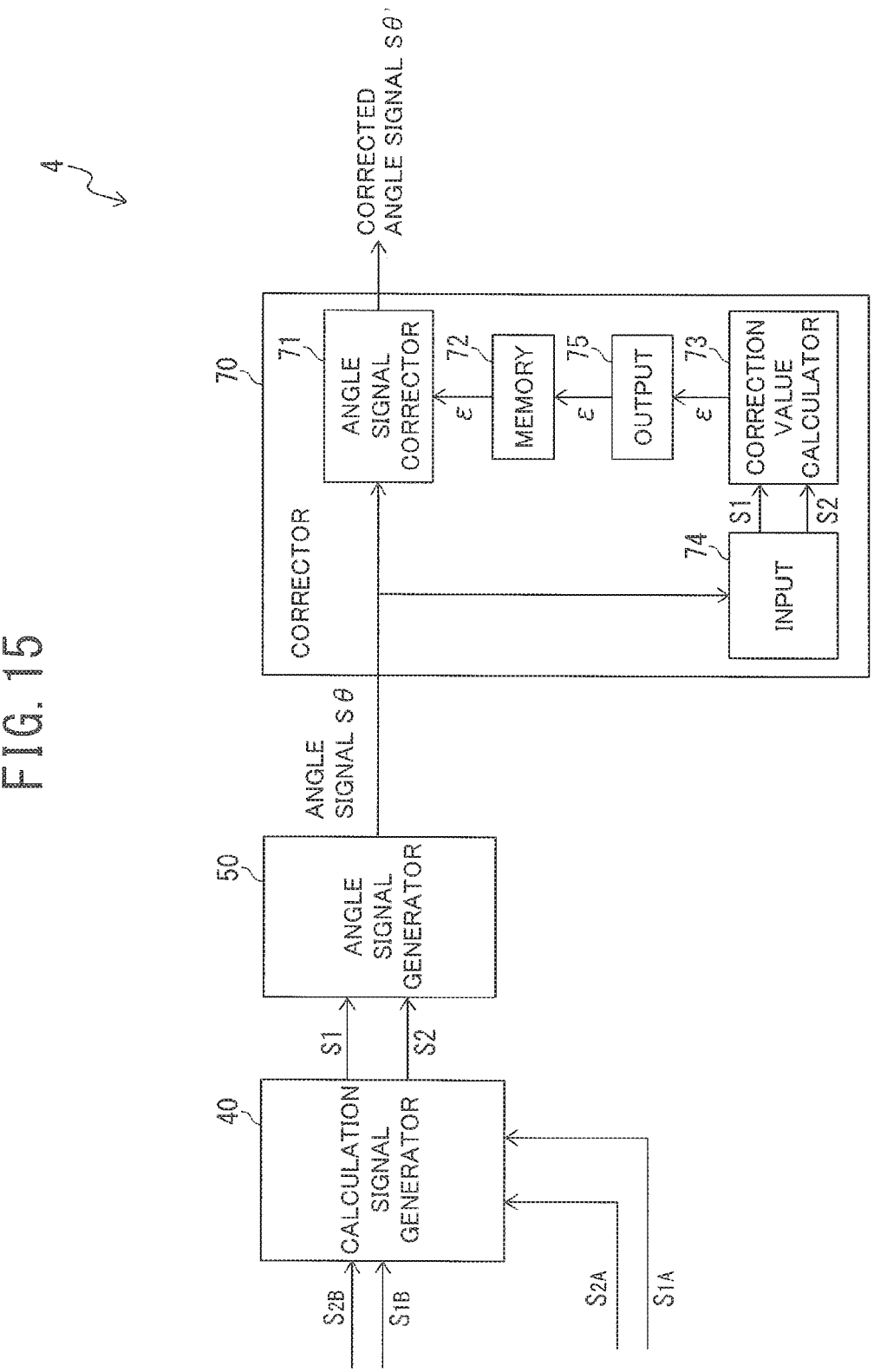
FIG. 15 is a block diagram illustrating another example of the configuration of the magnet and rotation angle detector in the rotation angle sensor according to the fourth embodiment.

A rotation angle sensor 4 according to a fourth embodiment will be described in detail, by using FIG. 14 and FIG. 15, while referring to FIG. 1 to FIG. 13. FIG. 14 is a block diagram illustrating an example of a configuration of the rotation angle sensor 4, and FIG. 15 is a block diagram illustrating another example of the configuration of the rotation angle sensor 4.

The rotation angle sensor 4 differs from the rotation angle sensors 1 to 3 according to the first to third embodiments, in that the rotation angle sensor 4 includes a corrector 60 or a corrector 70.

Hereinafter, the corrector 60 or the corrector 70 will be described in detail. Note that FIG. 14 and FIG. 15 illustrate configurations of the rear stage of the calculation signal generator 40 in the rotation angle sensor 4, and omit depictions of the magnet 10 and the magnetic detection elements (magnetic detection elements 31A, 31B, 32A and 32B, or biaxial magnetic detection elements 30A and 30B). In addition, since the calculation signal generator 40 and angle signal generator 50 have the same configurations as the corresponding parts of the rotation angle sensors 1 to 3 according to the first to third embodiments, a description thereof is omitted.

The corrector 60 or corrector 70 can be combined with any one of the rotation angle sensors 1 to 3 according to the first to third embodiments.

<Corrector>

There is a case in which the first magnetic field calculation signal S1 and second magnetic field calculation signal S2, which are output from the calculation signal generator 40, include error components. The kinds of such errors include an amplitude error between the first magnetic field calculation signal S1 and second magnetic field calculation signal S2; a cross-axis sensitivity error due to the fact that each of the first magnetic field calculation signal S1 and second magnetic field calculation signal S2 has cross-axis sensitivity; and an offset error due to the fact that each of the first magnetic field calculation signal S1 and second magnetic field calculation signal S2 has an offset component. The rotation angle sensor 4 of the present embodiment may include the corrector 60 or 70 for reducing the influence of such error components.

Hereinafter, the corrector will be described in detail. To begin with, the rotation angle sensor 4 illustrated in FIG. 14 will be described.

The corrector 60 corrects the first magnetic field calculation signal S1 and second magnetic field calculation signal S2, which are input from the calculation signal generator 40, and outputs a first magnetic field calculation signal S1' and a second magnetic field calculation signal S2', which are the corrected first magnetic field calculation signal S1 and second magnetic field calculation signal S2, to the angle signal generator 50. The corrector 60 includes a calculation signal corrector 61, a memory 62 and a correction value calculator 63. In addition, the corrector 60 includes an input 64 and an output 65.

(Calculation Signal Corrector)

The calculation signal corrector 61 is connected to the calculation signal generator 40, and receives the first magnetic field calculation signal S1 and second magnetic field calculation signal S2. In addition, based on a correction value s, the calculation signal corrector 61 outputs the first magnetic field calculation signal S1', which is the corrected first magnetic field calculation signal S1, and the second magnetic field calculation signal S2', which is the corrected second magnetic field calculation signal S2, and supplies the first magnetic field calculation signal S1' and second magnetic field calculation signal S2' to the angle signal generator 50.

Thereby, the angle signal generator 50 receives, as magnetic field calculation signals, the first magnetic field calculation signal S1' and second magnetic field calculation signal S2' which the calculation signal corrector 61 supplies, and outputs the angle signal Sθ.

The memory 62 stores the correction value ε which is used when the calculation signal corrector 61 performs a correction calculation. The memory 62 may store a plurality of correction values ε. In addition, when the date/time of creation of the correction value ε received from the correction value calculator 63, which will be described later, is later than the date/time of creation of the stored correction value ε, the memory 62 may update the correction value ε. Alternatively, the memory 62 may linearly combine a plurality of correction values ε, and may store the combined correction value ε as a new correction value ε.

The correction value calculator 63 receives the first magnetic field calculation signal S1 and second magnetic field calculation signal S2 from the calculation signal generator 40, and calculates a correction value ε for correcting the first magnetic field calculation signal S1 and second magnetic field calculation signal S2. The correction value calculator 63 receives the first magnetic field calculation signal S1 and second magnetic field calculation signal S2, and calculates a correction value ε for reducing at least one error among the offset error, amplitude error and cross-axis sensitivity error which these signals include. The correction value calculator 63 supplies the calculated correction value ε to the memory 62.

The input 64 receives the first magnetic field calculation signal S1 and second magnetic field calculation signal S2 from the calculation signal generator 40, and outputs these signals to the correction value calculator 63.

The output 65 receives the correction value ε from the correction value calculator 63, and outputs the correction value ε to the memory 62.

Next, the rotation angle sensor 4 illustrated in FIG. 15 will be described.

The angle signal Sθ, which is calculated in the angle signal generator 50, based on the first magnetic field calculation signal S1 and second magnetic field calculation signal S2, is input to the corrector 70. When the first magnetic field calculation signal S1 and second magnetic field calculation signal S2, which are output from the calculation signal generator 40, include error components, an error is also included in the angle signal Sθ which is calculated based on the first magnetic field calculation signal S1 and second magnetic field calculation signal S2. The corrector 70 corrects the angle signal Sθ which is input from the angle signal generator 50, and outputs a corrected angle signal Sθ'.

The corrector 70 includes an angle signal corrector 71, a memory 72 and a correction value calculator 73. In addition, the corrector 70 includes an acquisitor 74 and an output 75.

(Angle Signal Corrector)

In order to reduce the error occurring in the angle signal Sθ due to the above-described error component, the angle signal corrector 71 corrects the angle signal Sθ, and generates and outputs a corrected angle signal Sθ'. The angle signal Sθ is input to the angle signal corrector 71, and the angle signal corrector 71 corrects the error in the angle signal Sθ, based on a correction value s, and generates and outputs the corrected angle signal Sθ' in which the error of the angle signal Sθ is reduced.

The memory 72 stores the correction value ε which is used when the angle signal corrector 71 performs a correction calculation. The memory 72 may store a plurality of correction values. In addition, when the date/time of creation of the correction value received from the correction value calculator 73, which will be described later, is later than the date/time of creation of the stored correction value, the memory 72 may update the correction value. Alternatively, the memory 72 may linearly combine a plurality of correction values, and may store the combined correction value as a new correction value.

The correction value calculator 73 receives the angle signal Sθ from the angle signal generator 50, and calculates a correction value for correcting the angle signal Sθ. The correction value calculator 73 receives the angle signal Sθ, and calculates a correction value for reducing the error which this signal includes. The correction value calculator 73 supplies the calculated correction value to the memory 72.

In the present embodiment, although the configuration in which the correction value is calculated in the inside of the rotation angle sensor 4 was described, but the embodiment is not limited to this. Specifically, the calculation of the correction value may be performed outside the rotation angle sensor 4. In this case, for example, the correction value calculator 63, input 64 and output 65 are provided as a correction calculator on the outside of the rotation angle sensor 4. At this time, the input 64 receives the first magnetic field calculation signal S1 and second magnetic field calculation signal S2 from the rotation angle sensor, and the output 65 supplies the correction value to the rotation angle sensor.

Advantageous Effects of Fourth Embodiment

In the rotation angle sensor 4 according to the fourth embodiment, the following advantageous effect is obtained, in addition to the advantageous effects described in the first and third embodiments.

(6) The rotation angle sensor 4 includes the corrector 60 or 70. Thus, the error, which cannot completely be eliminated by the calculation in the calculation signal generator 40, can be corrected, and the angle signal (Sθ, Sθ') with higher precision can be output.

5. Modifications

In the rotation angle sensors 1 to 4 according to the first to fourth embodiments, the case was described in which the magnet 10 is polarized into one S pole and one N pole, but the embodiments are not limited to this configuration.

For example, the magnet 10 may be polarized into four or more poles in plan view. Even in this case, like the case of using the magnet polarized into two poles, each rotation angle sensor can detect a signal corresponding to the magnetic field at the element arrangement positions by using four magnetic detection elements or two biaxial magnetic detection elements. Thus, the calculation signal generator 40 can generate the first magnetic field calculation signal and second magnetic field calculation signal in which the disturbance magnetic fields are reduced and which have mutually different phases, and the angle signal generator 50 can generate and output the angle signal indicative of the rotation angle of the magnet.

The embodiments of the present disclosure have been described above, but the technical scope of the present disclosure is not limited to the technical scope described in the above embodiments. Various modifications or improvements can be added to the above embodiments, and it is clear, from the statement of the patent claims, that modes, in which such modifications or improvements are added, are included in the technical scope of the present disclosure.

REFERENCE SIGNS LIST

1, 2, 3, 4 Rotation angle sensor
10 Magnet
11 Rotational shaft
11A Rotational axis
20 Rotation angle detector
30A, 30B Biaxial magnetic detection element
31A, 31B, 32A, 32B, 33A, 33B Magnetic detection element
40 Calculation signal generator
50 Angle signal generator
60, 70 Corrector

The invention claimed is:

1. A rotation angle sensor comprising:
a magnet disposed to be rotatable around a rotational axis and polarized into at least two poles in a direction perpendicular to the rotational axis;
a first magnetic detection element and a second magnetic detection element configured to detect magnetic field in a first direction varying by a rotation of the magnet;
a third magnetic detection element and a fourth magnetic detection element configured to detect the magnetic field in a second direction, the second direction being different from the first direction;
a calculation signal generator configured to output a first magnetic field calculation signal, based on an output of the first magnetic detection element and an output of the second magnetic detection element, and configured to output a second magnetic field calculation signal, based on an output of the third magnetic detection element and an output of the fourth magnetic detection element, the second magnetic field calculation signal being different in phase from the first magnetic field calculation signal; and
an angle signal generator configured to generate and output an angle signal indicative of a rotation angle of the magnet, based on the first magnetic field calculation signal and the second magnetic field calculation signal, wherein
the first magnetic detection element and the second magnetic detection element are disposed at positions where a first disposition angle is greater than 0 degrees and less than 90 degrees, the first disposition angle is an angle formed by a line segment connecting the first magnetic detection element and the magnet and a line segment connecting the second magnetic detection element and the magnet,
the first disposition angle is, in plan view, a smaller angle of angles formed by a line segment connecting the first magnetic detection element and the rotational axis and a line segment connecting the second magnetic detection element and the rotational axis, or is, in cross-sectional view, a smaller angle of angles formed by a line segment connecting the first magnetic detection element and a center of the magnet, and a line segment connecting the second magnetic detection element and the center, and
the first magnetic detection element is disposed at a position different from a position of the third magnetic detection element.

2. The rotation angle sensor according to claim 1, wherein the second magnetic detection element is disposed at a position different from positions of the third magnetic detection element and the fourth magnetic detection element.

3. The rotation angle sensor according to claim 1, wherein a second disposition angle is less than the first disposition angle, the second disposition angle being, in plan view or cross-sectional view, a smaller angle of angles formed by a line segment connecting the third magnetic detection element and the rotational axis and a line segment connecting the fourth magnetic detection element and the rotational axis.

4. The rotation angle sensor according to claim 1, wherein the first magnetic detection element and the second magnetic detection element are arranged along the second direction.

5. The rotation angle sensor according to claim 1, wherein the third magnetic detection element and the fourth magnetic detection element are arranged along the first direction.

6. The rotation angle sensor according to claim 1, wherein the first direction is a direction perpendicular to the rotational axis.

7. The rotation angle sensor according to claim 6, wherein the second direction is a direction perpendicular to the first direction and perpendicular to the rotational axis.

8. The rotation angle sensor according to claim 6, wherein the second direction is a direction parallel to the rotational axis, and
the third magnetic detection element and the fourth magnetic detection element are disposed at positions deviating from a center of a thickness in a direction of the rotational axis of the magnet.

9. The rotation angle sensor according to claim 1, wherein the calculation signal generator is configured to:
generate the first magnetic field calculation signal by calculating a difference between the output of the first magnetic detection element and the output of the second magnetic detection element when the first magnetic detection element and the second magnetic detection element detect the magnetic field in the first direction, with an identical direction of the first direction being set as forward directions for the first magnetic detection element and the second magnetic detection element, and by calculating a sum between the output of the first magnetic detection element and the output of the second magnetic detection element when the first magnetic detection element and the second magnetic detection element detect the magnetic field in the first direction, with opposite directions of the first direction being set as forward directions for the first magnetic detection element and the second magnetic detection element,
generate the second magnetic field calculation signal different from the first magnetic field calculation signal, by calculating a difference between the output of the third magnetic detection element and the output of the fourth magnetic detection element when the third magnetic detection element and the fourth magnetic detection element detect the magnetic field in the second direction, with an identical direction of the second direction being set as forward directions for the third magnetic detection element and the fourth magnetic detection element, and by calculating a sum between the output of the third magnetic detection element and the output of the fourth magnetic detection element when the third magnetic detection element and the fourth magnetic detection element detect the magnetic field in the second direction, with opposite directions of the second direction being set as forward directions for the third magnetic detection element and the fourth magnetic detection element, and
output the first magnetic field calculation signal and the second magnetic field calculation signal.

10. The rotation angle sensor according to claim 1, wherein the rotation angle sensor includes at least one of a first biaxial magnetic detection element including the first magnetic detection element and the second magnetic detection element and configured to detect magnetic field in the first direction and magnetic field in the second direction, and a second biaxial magnetic detection element including the third magnetic detection element and the fourth magnetic detection element and configured to detect magnetic field in the first direction and magnetic field in the second direction.

11. The rotation angle sensor according to claim 10, wherein
the rotation angle sensor includes the first biaxial magnetic detection element and the second biaxial magnetic detection element configured to detect at least a magnetic field in a direction parallel to the rotational axis, and
the first biaxial magnetic detection element and the second biaxial magnetic detection element are disposed at non-line-symmetric positions with respect to a straight line which passes, in plan view, through the rotational axis of the magnet and is parallel to a magnetic field detection direction of the first biaxial magnetic detection element and the second biaxial magnetic detection element.

12. The rotation angle sensor according to claim 10, wherein the first biaxial magnetic detection element or the second biaxial magnetic detection element includes a magnetic convergence plate and a plurality of Hall elements.

13. The rotation angle sensor according to claim 1, wherein the first magnetic detection element, the second magnetic detection element, the third magnetic detection element and the fourth magnetic detection element are magnetoresistive elements.

14. The rotation angle sensor according to claim 2, further comprising:
a magnetic field signal corrector provided in a front stage of the angle signal generator and configured to correct the first magnetic field calculation signal and the second magnetic field calculation signal by using a correction value calculated based on the first magnetic field calculation signal and the second magnetic field calculation signal input from the calculation signal generator, and configured to output the corrected first magnetic field calculation signal and the corrected second magnetic field calculation signal to the angle signal generator.

15. The rotation angle sensor according to claim 1, further comprising:
a corrector provided in a rear stage of the angle signal generator and configured to correct the angle signal by using a correction value calculated based on the angle signal input from the angle signal generator, and configured to output the corrected angle signal.

16. The rotation angle sensor according to claim 2, wherein a second disposition angle is less than the first disposition angle, the second disposition angle being, in plan view or cross-sectional view, a smaller angle of angles formed by a line segment connecting the third magnetic detection element and the rotational axis and a line segment connecting the fourth magnetic detection element and the rotational axis.

17. The rotation angle sensor according to claim 2, wherein the first magnetic detection element and the second magnetic detection element are arranged along the second direction.

18. The rotation angle sensor according to claim 3, wherein the first magnetic detection element and the second magnetic detection element are arranged along the second direction.

19. An angle signal calculation method comprising:
acquiring a magnetic field in a first direction varying by a rotation of a magnet disposed to be rotatable around a rotational axis and polarized into at least two poles in a direction perpendicular to the rotational axis, as an output of a first magnetic detection element;
acquiring a magnetic field in the first direction as an output of a second magnetic detection element disposed at a position different from a position of the first magnetic detection element and at a position where a first disposition angle, relative to the first magnetic detection element, is greater than 0 degrees and less than 90 degrees, the first disposition angle being, in plan view, a smaller angle of angles formed by a line segment connecting the first magnetic detection element and the rotational axis and a line segment connecting the second magnetic detection element and the rotational axis, or being, in cross-sectional view, a smaller angle of angles formed by a line segment connecting the first magnetic detection element and a center of the magnet and a line segment connecting the second magnetic detection element and the center;

acquiring magnetic field in a second direction different from the first direction as an output of a third magnetic detection element and an output of a fourth magnetic detection element, the third magnetic detection element and the fourth magnetic detection element being disposed at positions different from the position of the first magnetic detection element;

outputting a first magnetic field calculation signal, based on the output of the first magnetic detection element and the output of the second magnetic detection element;

outputting a second magnetic field calculation signal different in phase from the first magnetic field calculation signal, based on the output of the third magnetic detection element and the output of the fourth magnetic detection element; and outputting an angle signal indicative of a rotation angle of the magnet, based on the first magnetic field calculation signal and the second magnetic field calculation signal.

20. A non-transitory computer readable medium having stored thereon a program causing a computer to execute:

acquiring a magnetic field in a first direction varying by a rotation of a magnet disposed to be rotatable around a rotational axis and polarized into at least two poles in a direction perpendicular to the rotational axis, as an output of a first magnetic detection element;

acquiring a magnetic field in the first direction as an output of a second magnetic detection element disposed at a position different from a position of the first magnetic detection element and at a position where a first disposition angle, relative to the first magnetic detection element, is greater than 0 degrees and less than 90 degrees, the first disposition angle being, in plan view, a smaller angle of angles formed by a line segment connecting the first magnetic detection element and the rotational axis and a line segment connecting the second magnetic detection element and the rotational axis, or being, in cross-sectional view, a smaller angle of angles formed by a line segment connecting the first magnetic detection element and a center of the magnet and a line segment connecting the second magnetic detection element and the center;

acquiring magnetic field in a second direction different from the first direction as an output of a third magnetic detection element and an output of a fourth magnetic detection element, the third magnetic detection element and the fourth magnetic detection element being disposed at positions different from the position of the first magnetic detection element;

outputting a first magnetic field calculation signal, based on the output of the first magnetic detection element and the output of the second magnetic detection element;

outputting a second magnetic field calculation signal different in phase from the first magnetic field calculation signal, based on the output of the third magnetic detection element and the output of the fourth magnetic detection element; and outputting an angle signal indicative of a rotation angle of the magnet, based on the first magnetic field calculation signal and the second magnetic field calculation signal.

* * * * *